US012614852B2

(12) United States Patent
Yue et al.

(10) Patent No.: US 12,614,852 B2
(45) Date of Patent: Apr. 28, 2026

(54) COMMUNICATION TERMINAL WITH INTERWOVEN AND FREE-STANDING ANTENNA RADIATORS

(71) Applicant: Apple Inc., Cupertino, CA (US)

(72) Inventors: Taiwei Yue, Union City, CA (US); Matthew N Ettus, Monte Sereno, CA (US); Jeffrey K Tu, Mountain View, CA (US); Kyle J Cormany, Atascadero, CA (US)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 18/525,476

(22) Filed: Nov. 30, 2023

(65) Prior Publication Data

US 2025/0183540 A1 Jun. 5, 2025

(51) Int. Cl.
*H01Q 9/04* (2006.01)
*H01Q 1/24* (2006.01)
(Continued)

(52) U.S. Cl.
CPC ............ *H01Q 9/0414* (2013.01); *H01Q 1/24* (2013.01); *H01Q 1/48* (2013.01); *H01Q 1/50* (2013.01)

(58) Field of Classification Search
CPC .......... H01Q 9/0414; H01Q 1/24; H01Q 1/48; H01Q 1/50
See application file for complete search history.

(56) References Cited

U.S. PATENT DOCUMENTS 7,746,283 B2 * 6/2010 Petropoulos ........... H01Q 13/10 343/770
10,658,762 B2 5/2020 Paulotto et al.
(Continued)

FOREIGN PATENT DOCUMENTS

KR 20220112613 A 8/2022
WO 2017086855 A1 5/2017
(Continued)

OTHER PUBLICATIONS

Ronglin Li et al., Development and Analysis of a Folded Shorted-Patch Antenna With Reduced Size, IEEE Transactions on Antennas and Propagation, Feb. 2004, pp. 555-562, vol. 52, No. 2, IEEE, New York, NY, United States.
(Continued)

*Primary Examiner* — Hai V Tran

(74) *Attorney, Agent, or Firm* — Treyz Law Group, P.C.; Michael H. Lyons

(57) ABSTRACT

A communication terminal may include interwoven high and low band phased array antennas that form signal beams in respective bands. The high band antenna may have center-grounded folded patch radiators. The low band antenna may have folded patch radiators that each surrounds a different respective center-grounded folded patch radiator of the high band antenna. The low and high band antennas may be mounted to ground traces on an antenna board. The antenna board may be mounted to a feeding board. Beamforming circuitry for the low and high band antennas may be disposed on the feeding board. The patch radiators of the low and high band antennas may be formed from free-standing folded sheet metal. The folded sheet metal may be mounted to the antenna board by conductive standoffs. The conductive standoffs may be used to feed the antenna radiators and/or to short the antenna radiators to the ground trace.

20 Claims, 9 Drawing Sheets

(51) Int. Cl.
*H01Q 1/48* (2006.01)
*H01Q 1/50* (2006.01)

(56) References Cited

U.S. PATENT DOCUMENTS

| | | | | |
|---|---|---|---|---|
| 11,217,905 | B2 | 1/2022 | Fleancu et al. | |
| 11,239,550 | B2 * | 2/2022 | Cooper | H01Q 1/526 |
| 11,349,204 | B2 | 5/2022 | Wu et al. | |
| 11,528,076 | B1 | 12/2022 | Bily et al. | |
| 11,552,405 | B1 | 1/2023 | Bily et al. | |
| 2004/0021606 | A1 | 2/2004 | Shigihara | |
| 2005/0116875 | A1 * | 6/2005 | Yuanzhu | H01Q 9/0442 343/846 |
| 2011/0012788 | A1 * | 1/2011 | Rowell | H01Q 9/0428 343/700 MS |
| 2012/0268347 | A1 | 10/2012 | Tatarnikov et al. | |
| 2014/0285382 | A1 * | 9/2014 | Dobric | H01Q 9/0414 343/700 MS |
| 2016/0072182 | A1 | 3/2016 | Wang et al. | |
| 2018/0097293 | A1 | 4/2018 | Piegsa et al. | |
| 2018/0123245 | A1 | 5/2018 | Toda et al. | |
| 2022/0131571 | A1 | 4/2022 | Lukyanov et al. | |
| 2022/0263242 | A1 * | 8/2022 | Sampo | H01Q 5/10 |
| 2022/0352635 | A1 | 11/2022 | Compton | |
| 2023/0084310 | A1 | 3/2023 | Cooper et al. | |
| 2023/0097868 | A1 | 3/2023 | Thiam et al. | |
| 2023/0155649 | A1 | 5/2023 | Hajimiri et al. | |
| 2023/0231311 | A1 | 7/2023 | Zhao et al. | |

FOREIGN PATENT DOCUMENTS

| | | | |
|---|---|---|---|
| WO | 2022060757 | A1 | 3/2022 |
| WO | 2023061604 | A1 | 4/2023 |

OTHER PUBLICATIONS

U.S. Appl. No. 18/458,916, filed Aug. 30, 2023.

* cited by examiner

COMMUNICATION TERMINAL WITH INTERWOVEN AND FREE-STANDING ANTENNA RADIATORS

FIELD

This relates generally to communication terminals, including communication terminals with wireless communications capabilities.

BACKGROUND

Communications networks have network nodes that that communicate with each other. The network nodes can include communication terminals. Communication terminals can have wireless circuitry for providing wireless communications capabilities to the communication terminals. The wireless circuitry includes antennas that convey radio-frequency signals.

It can be challenging to provide communication terminals with satisfactory levels of wireless performance. In general, providing a communication terminal with relatively large antenna structures can help to maximize wireless performance. At the same time, it is often desirable for communication terminals to implement antenna structures that are as compact and lightweight as possible.

SUMMARY

A communication terminal may include wireless circuitry. The wireless circuitry may include phased array antennas. The phased array antennas may include interwoven high and low band phased array antennas that share a single aperture. The high band phased array antenna may form a signal beam in a relatively high frequency band while the low band phased array antenna forms a signal beam in a relatively low signal band.

The high band phased array antenna may have center-grounded folded patch radiators. The low band phased array antenna may have folded patch radiators that each surrounds a different respective center-grounded folded patch radiator of the high band phased array antenna. The folded patch radiators of the low band phased array antenna may be surrounded by conductive fences.

The antenna radiators of the low and high band phased array antennas may be disposed in any desired array pattern. As one example, the antenna radiators of the high band phased array antenna may be disposed at vertices of first equilateral triangles of a first size. The antenna radiators of the low band phased array antenna may be disposed at vertices of second equilateral triangles of a second size greater than the first size. The second equilateral triangles may overlap the first equilateral triangles.

The low and high band phased array antennas may be mounted to ground traces on an antenna board. The antenna board may be mounted to a feeding board. Beamforming circuitry for the low and high band phased array antennas may be disposed on the feeding board. The patch radiators of the low and high band phased array antennas may be formed from free-standing folded sheet metal. The folded sheet metal may be mounted to the antenna board by conductive standoffs. The conductive standoffs may be used to feed the antenna radiators and/or to short the antenna radiators to the ground trace. Conductive fasteners may extend through some of the conductive standoffs and into locking nuts on the feeding board to help secure the feeding board to the antenna board. The low and high band phased array antennas may exhibit satisfactory levels of antenna performance while minimizing the weight of the communication terminal.

DETAILED DESCRIPTION

Figure 1:
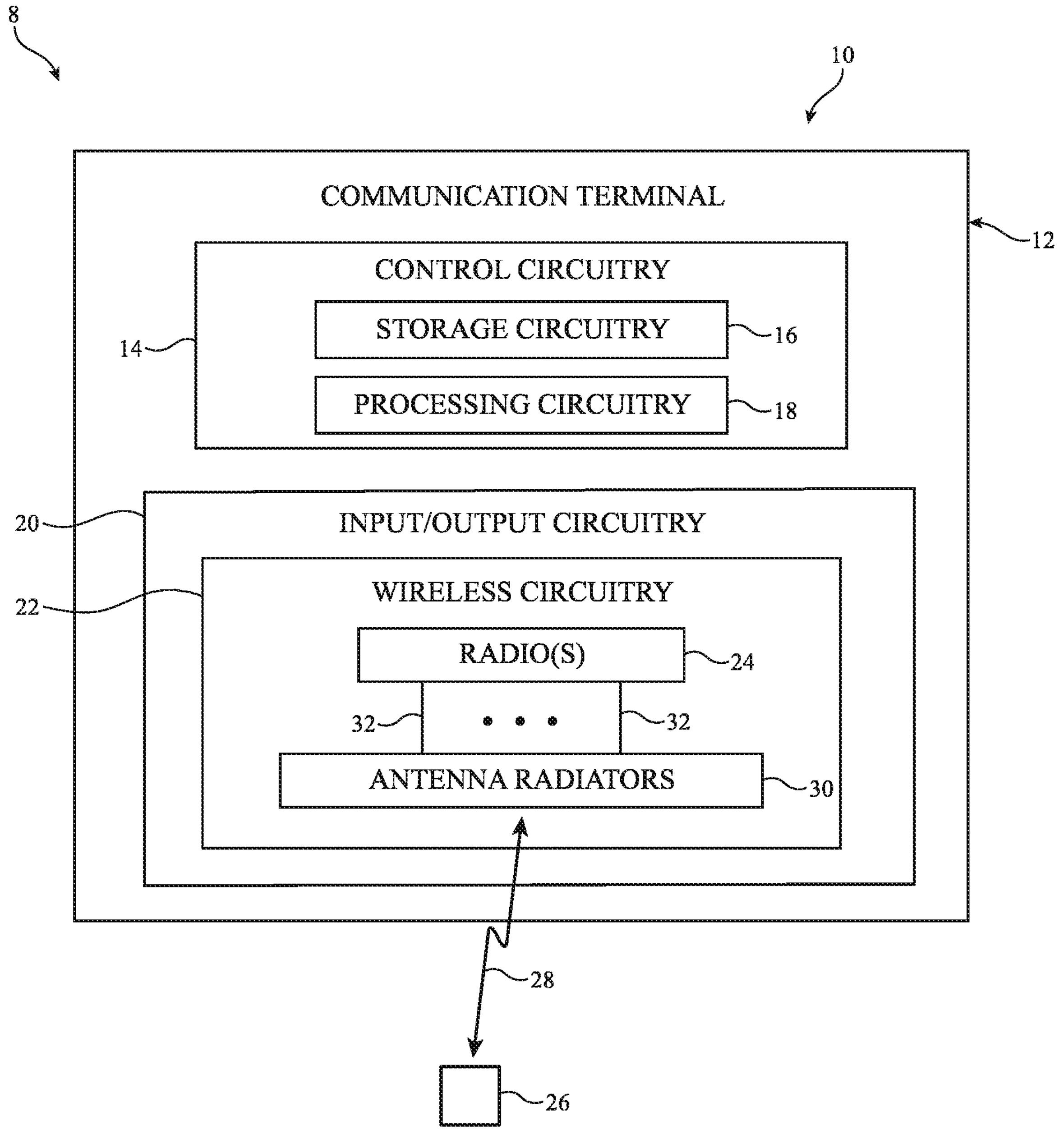
FIG. 1 is a schematic diagram of an illustrative communication system having a communication terminal with wireless circuitry in accordance with some embodiments.

FIG. 1 is a diagram of an illustrative communications system 8. Communications system 8 (sometimes referred to herein as communications network 8, network 8, or system 8) may include any desired number of network nodes, terminals, and/or end hosts that are communicably coupled together using communications paths that include wired and/or wireless links. The wired links may include cables (e.g., ethernet cables, optical fibers or other optical cables that convey signals using light, telephone cables, radio-frequency cables such as coaxial cables or other transmission lines, etc.). The wireless links may include short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles.

The nodes of communications system 8 may be organized into one or more relay networks, mesh networks, local area networks (LANs), wireless local area networks (WLANs), ring networks (e.g., optical rings), cloud networks, virtual/logical networks, the Internet (e.g., may be communicably coupled to each other over the Internet), combinations of these, and/or networks using any other desired network topologies. The nodes, terminals, and/or end hosts of communications system 8 may include network switches, network routers, optical add-drop multiplexers, other multiplexers, repeaters, modems, portals, gateways, servers, network cards (line cards), wireless access points, wireless base stations, other network components, physical components such as electronic devices, servers, computers, network racks, line cards, user equipment, etc., and/or may include virtual components that are logically defined in software and that are distributed across (over) two or more underlying physical devices (e.g., in a cloud network configuration).

The nodes of communications system 8 may include network nodes such as communication terminal 10 and external equipment 26. External equipment 26 may include another communication terminal such as communication terminal 10 or may include other network nodes in communications system 8. Communication terminal 10 may be some or all of an electronic device such as a laptop computer, tablet computer, wrist-watch device, pendant device, headphone device, earpiece device, headset device (e.g., virtual, augmented, or mixed reality glasses or goggles), or another wearable or miniature device, a handheld device such as a cellular telephone, a media player, or other small portable device, a set-top box, a desktop computer, a display into which a computer or other processing circuitry has been integrated, a display without an integrated computer, a gaming controller, a wireless access point, a wireless base station, an electronic device incorporated into a kiosk, building, vehicle, or satellite communications gateway (ground station), some or all of a communications satellite (e.g., a satellite in a satellite constellation that is controlled by a network operations center and that relays or conveys radio-frequency signals and wireless data between one or more ground stations and one or more user equipment devices on Earth in a bi-directional and/or uni-directional manner), some or all of a user equipment (UE) device operated by an end user, some or all of a network device operated by an entity other than an end user (e.g., a network operator, administrator, or service provider), some or all of a ground-based terminal for conveying radio-frequency signals and wireless data with one or more gateways (ground stations) via a constellation of communications satellites, some or all of a relay station or system, a network router, a network switch, a network line card, rack, or server, or other suitable electronic equipment for transmitting, receiving, and/or routing data with other nodes or terminals of communications system 8. Communication terminal 10 is sometimes also referred to herein as device 10, electronic device 10, apparatus 10, or wireless communication apparatus 10. Communication terminal 10 may be an end host or another network node that relays or routes wireless data between two other network nodes, terminals, and/or end hosts (e.g., communication terminal 10 need not be an end host of communication system 8).

Communication terminal 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements. If desired, communication terminal 10 may include support structures (e.g., for supporting communication terminal 10 on an underlying substrate, surface, of user's body, for supporting other device components or structures, etc.) and/or structures that cause communication terminal 10 to physically rotate or move (e.g., motors, actuators, propulsion systems, wheels, engines, etc.).

As shown in FIG. 1, communication terminal 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 14 may include processing circuitry such as processing circuitry 18. Processing circuitry 18 may be used to control the operation of communication terminal 10. Processing circuitry 18 may include one or more processors such as microprocessors, microcontrollers, digital signal processors, host processors, baseband processor integrated circuits, application specific integrated circuits, graphics processing units, central processing units (CPUs), etc. Control circuitry 14 may be configured to perform operations in communication terminal 10 using hardware (e.g., dedicated hardware or circuitry), firmware, and/or software. Software code for performing operations in communication terminal 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on communication terminal 10 such as internet browsing applications, voice-over-internet-protocol (VOIP) telephone call applications, email applications, media playback applications, other software applications, data routing or relay operations, communications scheduling operations, operating system functions, etc. To support interactions with external equipment such as external equipment 26, control circuitry 14 may be used in implementing communications protocols. Communications protocols that may be implemented using control circuitry 14 include internet protocols, wireless local area network protocols (e.g., IEEE 802.11 protocols—sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), satellite communications protocols, etc. Each communication protocol may be associated with a corresponding radio access technology (RAT) that specifies the physical connection methodology used in implementing the protocol.

Communication terminal 10 may include input-output circuitry 20. Input-output circuitry 20 may include input-output devices (not shown). The input-output devices may be used to allow data to be supplied to communication terminal 10 and to allow data to be provided from communication terminal 10 to external devices and/or a user. The input-output devices may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, wireless power receivers, wireless power transmitters, charging circuitry, solar panels or cells, temperature sensors, and/or other sensors and input-output components.

Input-output circuitry 20 may include wireless circuitry such as wireless circuitry 22 for wirelessly conveying radio-frequency signals 28. While control circuitry 14 is shown separately from wireless circuitry 22 in the example of FIG. 1 for the sake of clarity, wireless circuitry 22 may include processing circuitry that forms a part of processing circuitry 18 and/or storage circuitry that forms a part of storage circuitry 16 of control circuitry 14 (e.g., portions of control circuitry 14 may be implemented on wireless circuitry 22). As an example, control circuitry 14 may include baseband processor circuitry or other control components that form a part of wireless circuitry 22.

Wireless circuitry 22 may include one or more radios 24. Radio(s) 24 may include baseband circuitry (e.g., one or more baseband processors and/or other circuitry that operates at baseband) and one or more radio-frequency transceivers. Radio(s) 24 may be coupled to one or more antenna radiators 30 in wireless circuitry 22 over corresponding radio-frequency transmission lines 32. Radio(s) 24 may transmit and/or receive radio-frequency signals 28 using radio-frequency transmission lines 32 and antenna radiators 30 in one or more frequency bands at radio frequencies (sometimes referred to herein as communications bands or simply as "bands").

The frequency bands handled by radio(s) 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, cellular sidebands, 6G bands between 100-1000 GHz (e.g., sub-THz, THz, or THF bands), etc.), other centimeter or millimeter wave frequency bands between 10-300 GHz, IEEE 802.11ad bands communications at 60 GHz (e.g., WiGig or 60 GHz Wi-Fi bands around 57-61 GHz), near-field communications frequency bands (e.g., at 13.56 MHz), satellite navigation frequency bands (e.g., a Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, satellite communications bands such as the IEEE C band (4-8 GHz), S band (2-4 GHz), L band (1-2 GHz), X band (8-12 GHz), W band (75-110 GHz), V band (40-75 GHz), K band (18-27 GHz), $K_a$ band (26.5-40 GHz), $K_u$ band (12-18 GHz), and/or any other desired satellite communications bands, communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest.

Radio(s) 24 may perform unidirectional or bidirectional communication with external equipment 26 using radio-frequency signals 28. Bidirectional communications involve both the transmission of wireless data by wireless circuitry 22 and the reception of wireless data that has been transmitted by external wireless equipment. The wireless data may, for example, include data that has been encoded into corresponding data packets and/or frames such as wireless data associated with a telephone call, streaming media content, internet browsing, wireless data associated with software applications running on communication terminal 10, email messages, etc. If desired, wireless circuitry 22 may relay radio-frequency signals and/or wireless data between a first external device and a second external device in a bent pipe configuration. Radio(s) 24 may each include one or more integrated circuits, power amplifier circuitry, low-noise input amplifier circuitry, mixer circuitry, analog-to-digital converter circuitry, digital-to-analog converter circuitry, passive radio-frequency components, switching circuitry, transmission line structures, one or more transmitters, one or more receivers, and/or other circuitry for handling, transmitting, and/or receiving radio-frequency signals.

Radio(s) 24 may convey radio-frequency signals using one or more antenna radiators 30 (e.g., antenna radiators 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna radiators 30 may transmit the radio-frequency signals by radiating the radio-frequency signals into free space (or to freespace through intervening device structures such as a dielectric cover layer). Antenna radiators 30 may additionally or alternatively receive the radio-frequency signals from free space (e.g., through intervening devices structures such as a dielectric cover layer). The transmission and reception of radio-frequency signals by antenna radiators 30 each involve the excitation or resonance of antenna currents on the antenna radiators by the radio-frequency signals within the frequency band(s) of operation of the antenna radiators. While referred to herein as radiators, antenna radiators 30 may both transmit and receive radio-frequency signals 28, may only transmit radio-frequency signals 28, or may only receive radio-frequency signals 28.

In satellite navigation system links, satellite communications links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. To enhance gain and signal reception of radio-frequency signals 28 at communication terminal 10 and/or external equipment 26 when separated by relatively long distances, multiple antenna radiators 30 may be integrated into one or more corresponding phased array antennas. A phased array antenna may implement beam forming techniques to boost signal gain and to boost the effective range of wireless circuitry 22 in conveying radio-frequency signals 28. Antenna diversity schemes may also be used to ensure that the antenna radiators that have become blocked or that are otherwise degraded due to the operating environment of communication terminal 10 can be switched out of use and higher-performing antenna radiators used in their place.

Antenna radiators 30 are sometimes also referred to herein as antenna resonating elements 30, antenna radiating elements 30, radiators 30, or antenna elements 30. Antenna radiators 30 may be implemented using any desired antenna architecture. For example, antenna radiators 30 may be formed from patch antenna structures, stacked patch antenna structures, folded patch antenna structures, monopole antenna structures, dipole antenna structures, waveguide antenna structures, helical antenna structures, inverted-F antenna structures, planar inverted-F antennas, cavity-backed antenna structures, Yagi-Uda antenna structures, slot antenna structures, dielectric resonator antenna (DRA) structures, hybrids or combinations of these structures, etc. Each antenna radiator 30 may be coupled to one or more corresponding radio-frequency transmission lines 32 (e.g., may be directly fed antenna radiators that are coupled to the radio-frequency transmission line(s) at corresponding positive antenna feed terminals on the antenna radiators). If desired, antenna radiators 30 may include indirectly fed antenna radiators and/or parasitic elements.

Radio-frequency transmission lines 32 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguides, combinations of these, etc. Multiple types of transmission lines may be used to form a single transmission line path that couples a given radio 24 to an antenna feed on a corresponding antenna radiator 30. Filter circuitry, switching circuitry, impedance matching circuitry, phase shifter circuitry, amplifier circuitry, and/or other circuitry may be interposed on radio-frequency transmission lines 32, if desired. Radio-frequency transmission lines 32 in communication terminal 10 may be integrated into ceramic substrates, rigid printed circuit boards, and/or flexible printed circuits.

Figure 2:
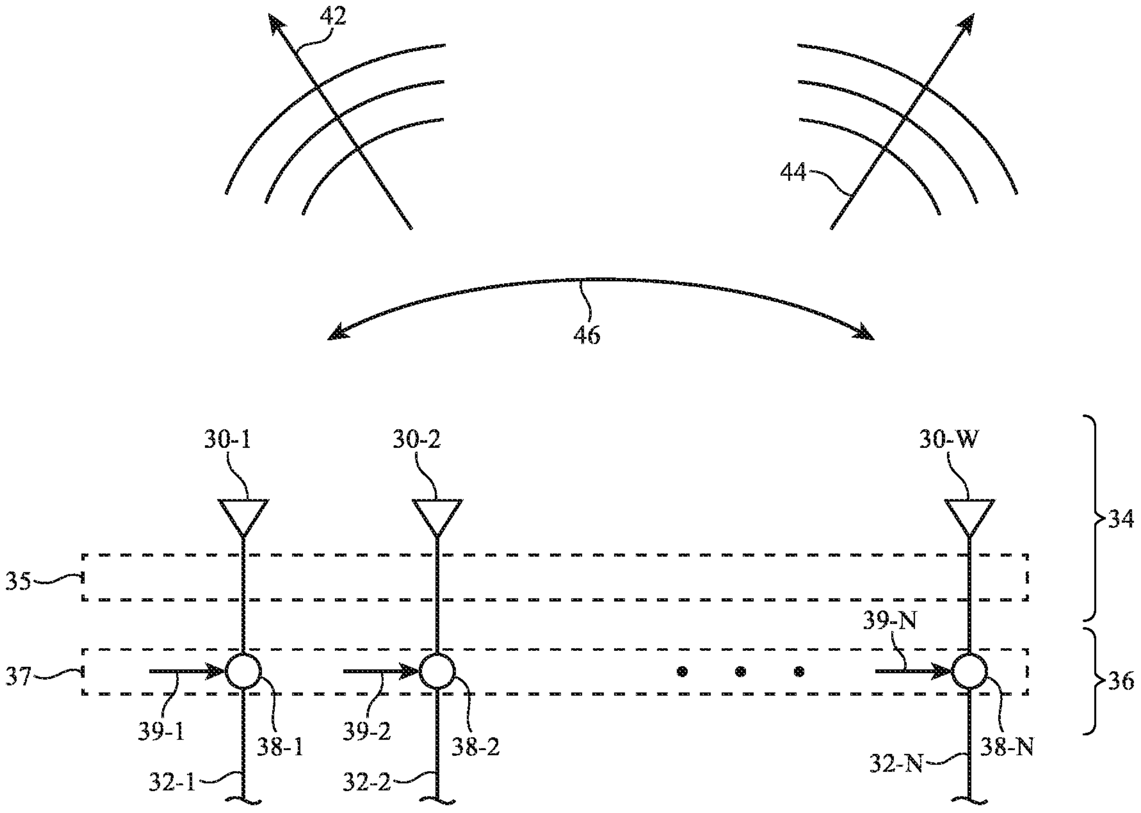
FIG. 2 is a diagram of an illustrative phased array antenna in accordance with some embodiments.

For long-distance wireless communications links between communication terminal 10 and external equipment 26, antenna radiators 30 may need to operate with a relatively high gain to maintain satisfactory wireless link quality. If desired, multiple antenna radiators 30 may be integrated into a phased array antenna to boost the gain of the antenna radiators in a particular direction (e.g., towards external communications equipment 26). FIG. 2 shows an example of how multiple antenna radiators 30 in communication terminal 10 may be arranged in a corresponding phased array antenna.

As shown in FIG. 2, a set of N antenna radiators 30 (e.g., a first radiator 30-1, a second radiator 30-2, an Nth radiator 30-N, etc.) may be arranged in a corresponding phased array antenna 34. N may be any desired integer greater than or equal to two. Phased array antenna 34 may include, for example, dozens or hundreds of antenna radiators 30. While referred to herein as a phased array antenna 34 of antenna radiators (elements) 30, phased array antenna 34 is sometimes also referred to as a phased antenna array (e.g., phased antenna array 34) and antenna radiators 30 are sometimes also referred to as antennas of the phased antenna array (e.g., antennas 30).

Each antenna radiator 30 in phased array antenna 34 may be coupled to a corresponding radio-frequency transmission line 32 (e.g., a first antenna radiator 30-1 in phased array antenna 34 may be coupled to a first radio-frequency transmission line 32-1, a second antenna radiator 30-2 in phased array antenna 34 may be coupled to a second radio-frequency transmission line 32-2, an Nth antenna radiator 30-N in phased array antenna 34 may be coupled to an Nth radio-frequency transmission line 32-N, etc.). Each radio-frequency transmission line 32 may be coupled to a respective transceiver chain in a corresponding radio 24 (FIG. 1). Each transceiver chain may include one or more transmit paths and/or one or more receive paths. The receive paths may be coupled together by a radio-frequency signal combiner if desired. Each antenna radiator 30 may be separated from one or more adjacent antenna radiators 30 in phased array antenna 34 by a predetermined distance that allows for beamforming (e.g., approximately one-half the wavelength of operation of antenna radiators 30).

A respective phase and magnitude controller 38 may be disposed on each radio-frequency transmission line 32-N (e.g., radio-frequency transmission line 32-1 may include a first phase and magnitude controller 38-1, radio-frequency transmission line 32-2 may include a second phase and magnitude controller 38-2, radio-frequency transmission line 32-N may include an Nth phase and magnitude controller 38-N, etc.). During signal transmission operations, radio-frequency transmission lines 32 may be used to supply signals (e.g., radio-frequency signals 28 of FIG. 1) from a corresponding radio 24 to phased array antenna 34 for wireless transmission to an external communication terminal (e.g., external equipment 26 of FIG. 1). During signal reception operations, radio-frequency transmission lines 32 may be used to convey signals received by phased array antenna 34 from the external communication terminal to radio 24.

The use of multiple antenna radiators 30 in phased array antenna 34 may allow beam forming arrangements to be implemented in which the relative phases and magnitudes (amplitudes) of the radio-frequency signals conveyed by the antenna radiators are controlled by phase and magnitude controllers 38. For example, during signal transmission, phase and magnitude controllers 38 may apply/impart different phases and/or magnitudes to the radio-frequency signals transmitted over radio-frequency transmission lines 32 that cause the radio-frequency signals, upon transmission by antenna radiators 30, to constructively and destructively interfere in a manner that forms a signal beam oriented in a particular direction (e.g., a beam pointing direction). The signal beam exhibits a peak gain in the beam pointing direction (e.g., oriented at a corresponding beam pointing angle) and reduced gain away from the beam pointing direction (e.g., the beam may exhibit a beam width associated with the physical spread of the electromagnetic energy associated with the signals).

Conversely, during signal reception, radio-frequency signals 28 (FIG. 1) are incident upon phased array antenna 34 from a particular direction. The wavefronts of the radio-frequency signals will be incident upon different antenna radiators 30 at slightly different times, given by the geometry of phased array antenna 34 and the incident angle of the signals. Phase and magnitude controllers 38 apply different phases and magnitudes to the signals received across phased array antenna 34 in a manner that causes the received signals to coherently sum when combined together (e.g., at a signal combiner). This allows the combined coherent signal to exhibit much higher gain than the signal as received by any single antenna radiator 30.

Phase and magnitude controllers 38 are sometimes also referred to collectively herein as beamforming circuitry 36.

Beamforming circuitry 36 may receive control signals 39 that cause phase and magnitude controllers 38 to form a corresponding signal beam (e.g., for transmitting radio-frequency signals in a particular beam pointing direction or for receiving radio-frequency signals from a particular beam pointing direction while allowing the received radio-frequency signals to coherently combine). Each phase and magnitude controller 38 may, for example, receive a different respective control signal 39 (e.g., phase and magnitude controller 38-1 may receive control signal 39-1, phase and magnitude controller 38-2 may receive control signal 39-2, phase and magnitude controller 38-N may receive control signal 39-N, etc.) that sets the phase and magnitude imparted by that phase and magnitude controller to a particular value. Control signals 39 may contain, identify, and/or represent corresponding beamforming coefficients or weights, for example. The beamforming coefficients or weights may be stored at a codebook on communication terminal 10 if desired.

Control signals 39 may adjust the phase and magnitude settings to steer or scan the direction of the signal beam formed by phased array antenna 34 over time, as shown by arrow 46. For example, at a first time, control signals 39 may control phase and magnitude controllers 38 to exhibit a first set of phase and magnitude settings that configure phased array antenna 34 to form a first signal beam in the direction of arrow 42 (e.g., for conveying radio-frequency signals with external equipment 26 (FIG. 1) located in the direction of arrow 42). At a second time, control signals 39 may control phase and magnitude controllers 38 to exhibit a second set of phase and magnitude settings that configure phased array antenna 34 to form a second signal beam in the direction of arrow 44 (e.g., for conveying radio-frequency signals with external equipment 26 (FIG. 1) located in the direction of arrow 44). In general, phased array antenna 34 may have any desired number of formable signal beams in any desired directions, from a boresight direction (e.g., having a beam pointing direction in a surface normal to the plane of antenna radiators 30) to directions off of boresight.

Phased array antenna 34 may be disposed on or mounted to a first substrate in communication terminal 10 such as substrate 35. If desired, beamforming circuitry 36 may be disposed on a second substrate in communication terminal 10 such as substrate 37. Substrate 37 may be different from substrate 35. Substrate 35 may be a first printed circuit board (e.g., a first rigid printed circuit board or a first flexible printed circuit), a first plastic substrate, a first package substrate, or a first ceramic substrate, as examples. Substrate 35 is sometimes also referred to herein as antenna board 35.

Substrate 37 may be a second printed circuit board (e.g., a second rigid printed circuit board or a second flexible printed circuit), a second plastic substrate, a second package substrate, or a second ceramic substrate, as examples. Substrate 37 is sometimes also referred to herein as feeding board 37. If desired, substrate 35 may be mounted to substrate 37 using fasteners, screws, standoffs, clips, brackets, solder, and/or other interconnects or mounting structures. When mounted to substrate 37, there may be a gap between substrate 35 and 37 that is free from dielectric material to further reduce the weight of communication terminal 10. If desired, radio 24 and the other components of communication terminal 10 (FIG. 1) may be mounted to substrate 37 or may be mounted to other substrates or structures in communication terminal 10 that are different from substrates 35 and 37 (e.g., a different housing portion of communication terminal 10, a bus for communication terminal 10, a fairing for communication terminal 10, etc.).

Figure 3:
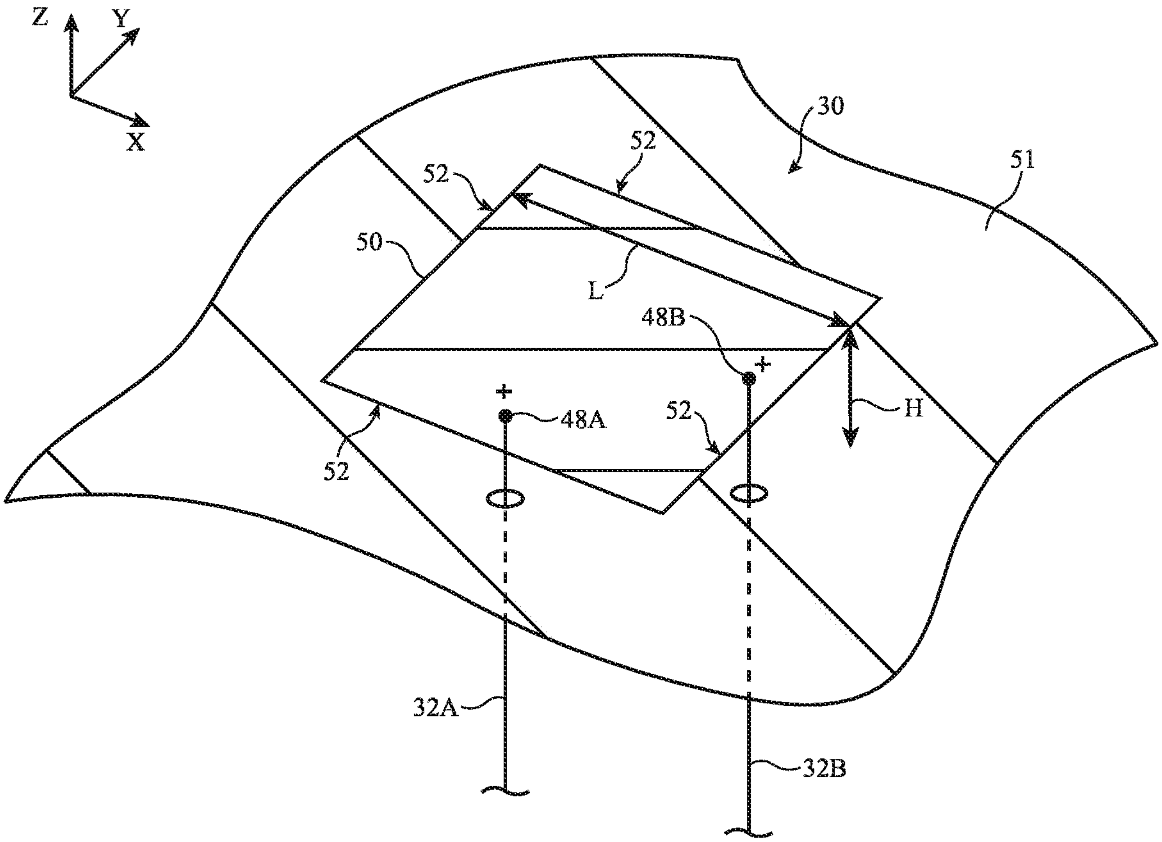
FIG. 3 is a perspective view of an illustrative patch radiator that may be implemented in a phased array antenna in accordance with some embodiments.

Antenna radiators 30 may be implemented using any desired antenna structures. In some implementations that are described herein as an example, antenna radiators 30 may include patch radiators. FIG. 3 is a perspective view showing how an antenna radiator 30 may be implemented as a patch radiator (sometimes also referred to herein as a patch antenna).

As shown in FIG. 3, antenna radiator 30 may have a patch radiator 50 that is separated from and parallel to an antenna ground plane such as antenna ground 51 (sometimes referred to herein as ground 51 or ground plane 51). At least some (e.g., all) of patch radiator 50 may lie within a plane such as the X-Y plane of FIG. 3 (e.g., the lateral surface area of patch radiator 50 may lie in the X-Y plane). Patch radiator 50 is sometimes be referred to herein as patch antenna resonating element 50, patch 50, patch element 50, patch resonating element 50, or patch radiating element 50. When implemented using patch radiator 50, antenna radiator 50 may sometimes also be referred to as a patch antenna.

Antenna ground 51 may lie within a plane that is parallel to the plane of patch radiator 50. Patch radiator 50 and antenna ground 51 may therefore lie in separate parallel planes that are separated by at least one fixed height H. In some implementations, patch radiator 50 and antenna ground 51 are formed from conductive traces patterned on a dielectric substrate such as ceramic, a rigid printed circuit board substrate, or a flexible printed circuit substrate. Patch radiator 50 may be formed from a free-standing metal layer (e.g., sheet metal) that is held at height H above antenna ground 51 (e.g., without any intervening dielectric substrate between patch radiator 50 and antenna ground 51).

To enhance the polarizations handled by antenna radiator 30, antenna radiator 30 may be provided with multiple feeds. As shown in FIG. 3, antenna radiator 30 may have a first feed (port) that is coupled to a first radio-frequency transmission line 32 such as radio-frequency transmission line 32A and a second feed (port) that is coupled to a second radio-frequency transmission line 32 such as radio-frequency transmission line 32B. The first feed may have a first ground feed terminal coupled to antenna ground 51 (not shown in FIG. 3 for the sake of clarity) and a first positive feed terminal 48A coupled to patch radiator 50. The second feed may have a second ground feed terminal coupled to antenna ground 51 (not shown in FIG. 3 for the sake of clarity) and a second positive feed terminal 48B on patch radiator 50. Holes, slots, or other openings may be formed in antenna ground 51 to allow radio-frequency signals to be transmitted from one side of the ground plane to the other.

When using the first feed associated with positive feed terminal 48A, antenna radiator 30 may transmit and/or receive radio-frequency signals having a first polarization (e.g., the electric field of the radiated signals generated by antenna current conveyed through positive feed terminal 48A may be oriented parallel to the Y-axis in FIG. 3). When using the feed associated with positive feed terminal 48B, antenna radiator 30 may transmit and/or receive radio-frequency signals having a second orthogonal polarization (e.g., the electric field of the radiated signals generated by antenna current conveyed through positive feed terminal 48B may be oriented parallel to the X-axis of FIG. 3 so that the polarizations associated with positive feed terminals 48A and 48B are orthogonal to each other).

One of positive feed terminals 48A and 48B may be used at a given time to configure antenna radiator 30 to operate as a single-polarization radiator. If desired, the active feed may be changed over time so antenna radiator 30 can switch between covering vertical or horizontal polarizations at a given time. Additionally or alternatively, both positive feed terminals may be operated at the same time with controlled phasing between the two feeds to configure antenna radiator 30 to operate with other polarizations (e.g., as a dual-polarization radiator, a circularly-polarized radiator, an elliptically-polarized radiator, etc.). Positive feeds terminals 48A and 48B may be coupled to different phase and magnitude controllers or may both be coupled to the same phase and magnitude controller. If desired, positive feed terminals 48A and 48B may both be operated with the same phase and magnitude at a given time (e.g., when antenna radiator 30 acts as a dual-polarization radiator). If desired, the phases and magnitudes of radio-frequency signals conveyed over positive feed terminals 48A and 48B may be controlled separately and varied over time so antenna radiator 30 exhibits other polarizations (e.g., circular or elliptical polarizations). The example of FIG. 3 is merely illustrative. Antenna radiator 30 may have any desired number of feeds. Other types of antenna structures may be used if desired.

Patch radiator 50 may have one or more edges 52. In the example of FIG. 3, patch radiator 50 is a rectangular (e.g., square) patch having four orthogonal edges 52. This is illustrative and non-limiting. In general, patch radiator 50 may have one or more curved and/or straight edges 52 and may have any desired shape (e.g., a hexagonal shape having six edges 52, a triangular shape having three edges 52, a pentagonal shape having five edges 52, an octagonal shape having eight edges 52, a circular or elliptical shape having a single curved edge, an annular shape having both a curved inner edge and a curved outer edge, or any other desired shape).

The dimensions of patch radiator 50 may be selected so that antenna radiator 30 resonates (radiates) at desired operating frequencies. For example, a given edge 52 and/or patch radiator 50 may have a dimension (length) L that is approximately equal to half of the wavelength of the radio-frequency signals conveyed by antenna radiator 30.

In the example of FIG. 3, patch radiator 50 is a planar patch confined to a single plane. If desired, patch radiator 50 may be a folded patch (FP). When implemented as a folded patch, one or more of the edges 52 of patch radiator 50 may be folded downwards and may extend towards antenna ground 51. If desired, one or more of the edges of the folded patch may be shorted to antenna ground 51. If desired, one or more other points on the lateral area of patch radiator 50 within the X-Y plane (e.g., a point at the center of patch radiator 50) may be coupled or shorted to antenna ground 51 by a grounding structure (not shown). When implemented as a folded patch, patch radiator 50 is sometimes also referred as a folded patch radiator or a folded patch antenna. When implemented as a folded patch that is shorted to antenna ground 51, patch radiator 50 is sometimes also referred to as a grounded folded patch, a grounded folded patch antenna, a grounded folded patch radiator, or a planar inverted-F antenna (e.g., when a single edge 52 is shorted to antenna ground 51). When implemented as a grounded folded patch having its center point shorted to antenna ground 51 by a grounding structure, patch radiator 50 is sometimes also referred to as a center-grounded folded patch (CGFP).

If desired, communication terminal 10 may include multiple phased array antennas 34 for covering different frequency bands. This may allow communication terminal 10 to concurrently convey radio-frequency signals in each of the different frequency bands (e.g., within different respective signal beams which may be oriented in the same direction or in different directions). For example, communication terminal 10 may include a low band phased array antenna 34 for conveying radio-frequency signals in a relatively low frequency band (e.g., an L band or another band) and a high band phased array antenna 34 for conveying radio-frequency signals in a relatively high band (e.g., an S band or another band higher in frequency than the relatively low band). The antenna radiators 30 in the low band phased array antenna may have patch radiators 50 (FIG. 3) that are sized to radiate in the relatively low frequency band and that are spaced apart to support beam forming by the low band phased array antenna in the relatively low frequency band. The antenna radiators 30 in the high band phased array antenna may have patch radiators 50 (FIG. 3) that are sized to radiate in the relatively high frequency band and that are spaced apart to support beam forming by the high band phased array antenna in the relatively high frequency band.

In some implementations, the low band phased array antenna is separated and offset from the high band phased array antenna in communication terminal 10. This may, however, consume an excessive amount of space in communication terminal 10, which can also increase the weight and size of communication terminal 10. To minimize space consumption by the phased array antennas and the weight and size of communication terminal 10, the low band phased array antenna may be interleaved or interwoven with the high band phased array antenna on substrate 35 (FIG. 2).

Figure 4:
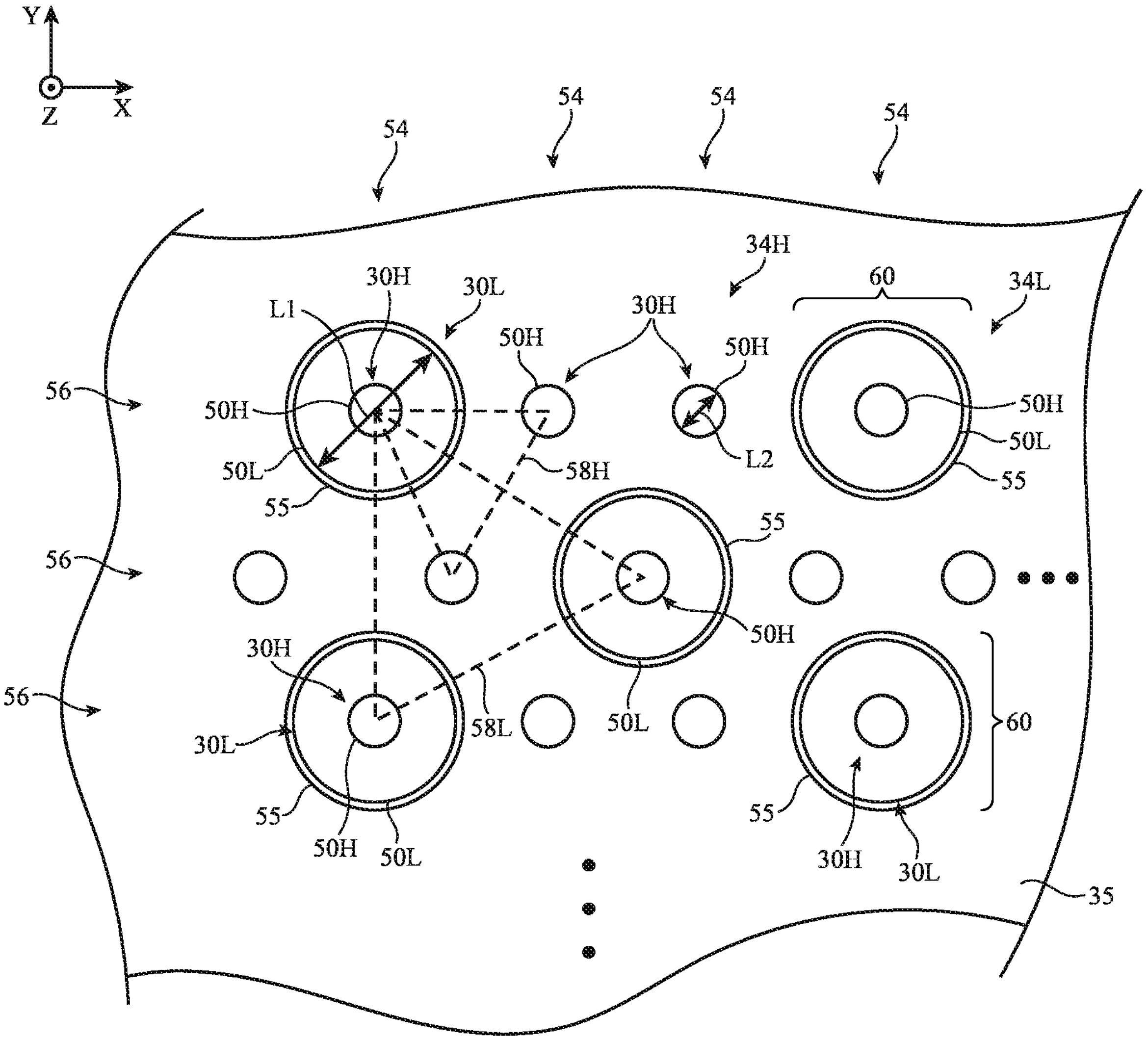
FIG. 4 is a top view of illustrative interwoven low and high band phased array antennas in accordance with some embodiments.

FIG. 4 is a top view showing how a low band phased array antenna and a high band phased antenna array may be interleaved or interwoven on the same substrate. As shown in FIG. 4, communication terminal 10 may include a low band phased array antenna 34L and a high band phased array antenna 34H disposed on or mounted to substrate 35. Low band phased array antenna 34L includes low band antenna radiators 30L that convey radio-frequency signals in the relatively low frequency band. High band phased array antenna 34H includes high band antenna radiators 30H that convey radio-frequency signals in the relatively high frequency band.

High band antenna radiators 30H and low band antenna radiators 30L may be implemented as patch radiators (e.g., patch radiator 50 of FIG. 3). As such, high band antenna radiators 30H may have patch radiators 50H and low band antenna radiators 30L may have patch radiators 50L. Patch radiators 50H may be shaped and sized to configure high band antenna radiators 30H to radiate in the relatively high frequency band whereas patch radiators 50L are shaped and sized to configure low band antenna radiators 30L to radiate in the relatively low frequency band. Patch radiators 50H may, for example, have a relatively short dimension L2 (e.g., dimension L of FIG. 3) and patch radiators 50L may have a relatively long dimension L1 (e.g., dimension L of FIG. 3) that is greater than dimension L2.

The patch radiators 50H in high band phased array antenna 34H may be laterally separated from each other (e.g., within the X-Y plane) by a first distance associated with the relatively high frequency band used by high band antenna radiators 30H to convey radio-frequency signals. For example, every three patch radiators 50H in high band phased array antenna 34H may be disposed at a respective vertex of a corresponding equilateral triangle 58H having side lengths equal to the first distance. When disposed in this way, high band phased array antenna 34H may have high band antenna radiators 30H that are arranged in a staggered grid pattern having rows 56 and columns 54, where high band antenna radiators 30H in the same column 54 are disposed in every other row 56 of the phased array antenna.

The patch radiators 50L in low band phased array antenna 34L may be laterally separated from each other by a second distance associated with the relatively low frequency band used by high band radiators 30H to convey radio-frequency signals (e.g., where the second distance is greater than the first distance). For example, every three patch radiators 50L in low band phased array antenna 34L may be disposed at a respective vertex of a corresponding equilateral triangle 58L having side lengths equal to the second distance. When disposed in this way, low band phased array antenna 34L may have low band antenna radiators 30L that are also arranged in a staggered grid pattern having rows 56 and columns 54, where low band antenna radiators 30L in the same column 54 are disposed in every other row 56 of the phased array antenna.

As shown in the example of FIG. 4, high band phased array antenna 34H may be interwoven or interleaved with low band phased array antenna 34L on substrate 35. This may involve disposing the patch radiator 50L of each low band antenna radiator 30L in low band phased array antenna 34L concentrically with and surrounding the patch radiator 50H of a respective high band antenna radiator 30H in high band phased array antenna 34H. In addition, the rows 56 and columns 54 of high band phased array antenna 34H are the same as the rows 56 and columns 54 of low band phased array antenna 34L. When interwoven in this way, the equilateral triangles 58L defining the layout pattern for each triplet of low band antenna radiators 30L in low band phased array antenna 34L intersect with and overlap one or more of the equilateral triangles 58H defining the layout pattern for triplets of high band antenna radiator 30H in high band phased array antenna 34H. Phased array antennas 34L and 34H may thereby share the same antenna aperture on communication terminal 10 (e.g., are entirely or substantially overlapping with respect to each other).

If desired, each low band antenna radiator 30L in low band phased array antenna 34L may be laterally surrounded by a corresponding conductive fence 55 mounted to substrate 35. Each conductive fence 55 and the antenna radiators 30H and 30L enclosed or surrounded by that conductive fence 55 are sometimes referred to collectively herein as a unit cell 60 of antenna radiators. Unit cell 60 is sometimes also referred to as a dual band antenna element, an antenna tile, or a multi-element subarray of the overall array formed by phased array antennas 34H and 34L. Unit cells 60 may be arranged in a staggered pattern in every other row 56 for a given column 54 and in every third column 54 of a given row 56, for example.

The layout pattern of FIG. 4 in which antenna radiators 30H and 30L are all arranged at respective vertices of equilateral triangles (e.g., in an equilateral triangle grid) is illustrative and non-limiting. In general, high band antenna radiators 30H and low band antenna radiators 30L may be interleaved or interwoven in any desired manner on substrate 35 (e.g., in a square grid pattern, a hexagonal grid pattern, or any other desired pattern). The equilateral triangular grid pattern (lattice) of FIG. 4 may, for example, help to maximize angular range over which phased array antennas 34H and 34L perform beam scanning/sweeping.

In the example of FIG. 4, patch radiators 50H have a circular lateral outline or shape (e.g., in the X-Y plane) and patch radiators 50L have an annular lateral outline or shape. This is illustrative and non-limiting. In general, patch radiators 50H and 50L may have lateral outlines or shapes that are elliptical, hexagonal, square, rectangular, hexagonal ring-shaped, elliptical ring-shaped, square ring-shaped, or any other desired shapes having any desired number of curved and/or straight edges (e.g., where patch radiators 50L have a central opening within which corresponding patch radiators 50H are disposed).

If desired, the patch radiators 50H in high band phased array antenna 34H and the patch radiators 50L in low band phased array antenna 34L may be implemented as free-standing folded patches (e.g., free-standing folded patch radiators). When implemented as folded patch radiators, portions of patch radiators 50H and portions of patch radiators 50L are folded downwards towards substrate 35 (e.g., in the −Z direction). In these implementations, the dimension L1 of patch radiators 50L is given by both the lateral width or diameter of patch radiators 50L in the X-Y plane and the vertical length of the portion of patch radiators 50L that is folded downwards towards substrate 35. Similarly, the dimension L2 of patch radiators 50H is given by both the lateral width, diameter, or dimension of patch radiators 50H in the X-Y plane and the vertical length of the portion of patch radiators 50H that is folded downwards towards substrate 35.

Figure 5:
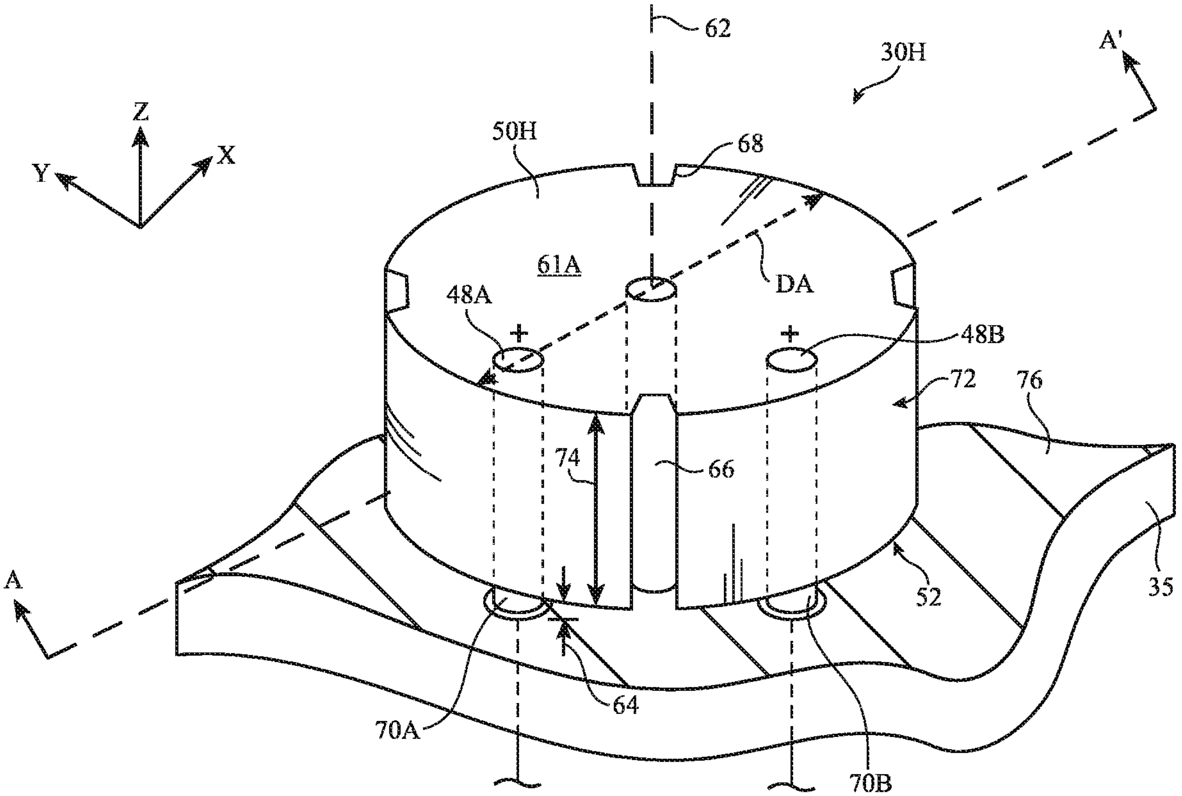
FIG. 5 is a perspective view of an illustrative free-standing antenna radiator in a high band phased array antenna in accordance with some embodiments.

FIG. 5 is a perspective view of a high band antenna radiator 30H in high band phased array antenna 34H, in an example where the patch radiator 50H of the high band antenna radiator is implemented as a free-standing folded patch radiator. High band antenna radiator 30H of FIG. 5 may be disposed within a corresponding unit cell 60 of FIG. 4 (in which case the surrounding low band antenna radiator 30L and conductive fence 55 have been omitted from FIG. 5 for the sake of clarity) or may be disposed between unit cells 60 of FIG. 4 (e.g., without being laterally surrounded by a conductive fence 55 and low band antenna radiator 30L).

As shown in FIG. 5, patch radiator 50H may include a lateral (planar) portion 61A that lies within or parallel to the X-Y plane. Lateral portion 61A may have a circular outline or other shapes. To implement patch radiator 50H as a folded patch, the edges 52 of patch radiator 50H are folded downwards towards substrate 35. As such, patch radiator 50H has a vertical sidewall 72 that extend from the edges of lateral portion 61A to edges 52 (e.g., a continuously curved sidewall or, more generally, one or more sidewalls that follow the lateral outline of lateral portion 61A).

Edges 52 may be separated from ground traces 76 on substrate 35 by gap 64. Sidewall 72 has height 74 (e.g., parallel to the Z-axis). Lateral portion 61A has diameter DA. The overall radiating length of patch radiator 50H (e.g., dimension L2 of FIG. 4) may be approximately equal to the sum of diameter DA and twice height 74, for example. Patch radiator 50H has a central axis 62 that extends orthogonal to lateral portion 61A (e.g., parallel to the Z-axis) through the center of patch radiator 50H.

Patch radiator 50H is free-standing and is mounted to substrate 35 without any intervening dielectric layers or supports. For example, patch radiator 50H may be formed from folded, bent, and/or stamped sheet metal that is mounted to ground traces 76 on substrate 35.

The sheet metal may be formed from copper, aluminum, or other materials. Forming patch radiator 50H from aluminum may help to minimize the weight of high band antenna radiator 30H. The sheet metal may be provided with a relatively narrow thickness (e.g., 0.5 mm or less) to further reduce weight. At the same time, the sheet metal is thick enough to retain its rigid shape after mounting to substrate 35. Forming patch radiator 50H in this way may leverage both high volume sheet metal manufacturing processes (e.g., progressive die stamping) as well as high volume printed circuit board assembly (PCBA) processes such as surface mount technology (SMT). This may help to facilitate high volume assembly of the phased array antennas in the communication terminal.

Ground traces 76 may form part of the antenna ground for high band antenna radiator 30H (e.g., antenna ground 51 of FIG. 3). Patch radiator 50H may be grounded to ground traces 76 using ground interconnect 66. Ground interconnect 66 may, for example, couple the center of patch radiator 50H to ground traces 76 (e.g., ground interconnect 66 may extend along central axis 62). Ground interconnect 66 may electrically short patch radiator 50H to ground traces 76 at central axis 62. This may serve to alter the current distribution and radiation pattern of the antenna in a manner that optimizes the radio-frequency performance of high band antenna radiator 30H while allowing high band antenna radiator 30H to occupy a relatively small volume on the communication terminal.

At the same time, ground interconnect 66 is rigid and may serve to mechanically mount and secure patch radiator 50H to substrate 35. Ground interconnect 66 may include a conductive standoff, a conductive screw or fastener, a conductive pin, a conductive clip, solder, welds, conductive adhesive, a conductive bracket, a conductive spring, a conductive prong, a conductive pillar, a conductive column, and/or any other desired structures that serve to mechanically mount, attach, and/or secure patch radiator 50H to substrate 35 (e.g., while holding patch radiator 50H over substrate 35 such that edges 52 are separated from ground traces 76 by gap 64), while also electrically shorting patch radiator 50H (at central axis 62) to ground traces 76. In this way, high band antenna radiator 30H may be implemented as a center-grounded folded patch (CGFP) (e.g., patch radiator 50H may be a CGFP). Alternatively, ground interconnect 66 may mechanically secure patch radiator 50H to substrate 35 (e.g., as a standoff) without also electrically shorting patch radiator 50H to ground traces 76.

High band antenna radiator 30H may be fed by positive antenna feed terminals 48A and 48B on lateral portion 61A. A first feed interconnect 70A may couple a first radio-frequency transmission line for high band antenna radiator 30H (e.g., radio-frequency transmission line 32A of FIG. 3) to positive antenna feed terminal 48A. A second feed interconnect 70B may couple a second radio-frequency transmission line for high band antenna radiator 30H (e.g., radio-frequency transmission line 32B of FIG. 3) to positive antenna feed terminal 48B. Feed interconnects 70A and 70B may be coupled to the corresponding radio-frequency transmission lines through substrate 35 (e.g., without shorting the feed structures to ground traces 76).

If desired, feed interconnects 70A and 70B may be rigid and may also serve to mechanically mount and secure patch radiator 50H to substrate 35 (e.g., may form standoffs for patch radiator 50H). For example, feed interconnects 70A and 70B may include conductive standoffs, conductive pins (e.g., pogo pins), conductive clips, conductive screws, solder, welds, conductive adhesive, conductive brackets, conductive springs, conductive prongs, conductive pillars, conductive columns, and/or any other desired structures that serve to mechanically mount, attach, and/or secure patch radiator 50H to substrate 35 (e.g., while holding patch radiator 50H over substrate 35 such that edges 52 are separated from ground traces 76 by gap 64), while also electrically coupling positive antenna feed terminals 48A and 48B to the corresponding radio-frequency transmission lines. Ground interconnect 66 and feed interconnects 70 may be mounted to substrate 35 using solder and a surface mount technology (SMT) process, for example. Ground interconnect 66 and feed interconnects 70 may allow patch radiator 50H, which is rigid, to remain free-standing over substrate 35 without any intervening substrates, printed circuit boards, supports, or other dielectric materials between substrate 35 and lateral area 61A of patch radiator 50H.

If desired, one or more notches (slots) 68 may be cut into patch radiator 50H (e.g., at lateral portion 61A and/or within sidewall 72). Notches 68 may be used to tune or tweak the frequency response of high band antenna radiator 30H, to perform impedance matching for one or both of positive antenna feed terminals 48A and 48B, to tune the polarization response of high band antenna radiator 30H, and/or to further reduce the weight of high band antenna radiator 30H and thus the weight of communication terminal 10 itself.

Figure 6:
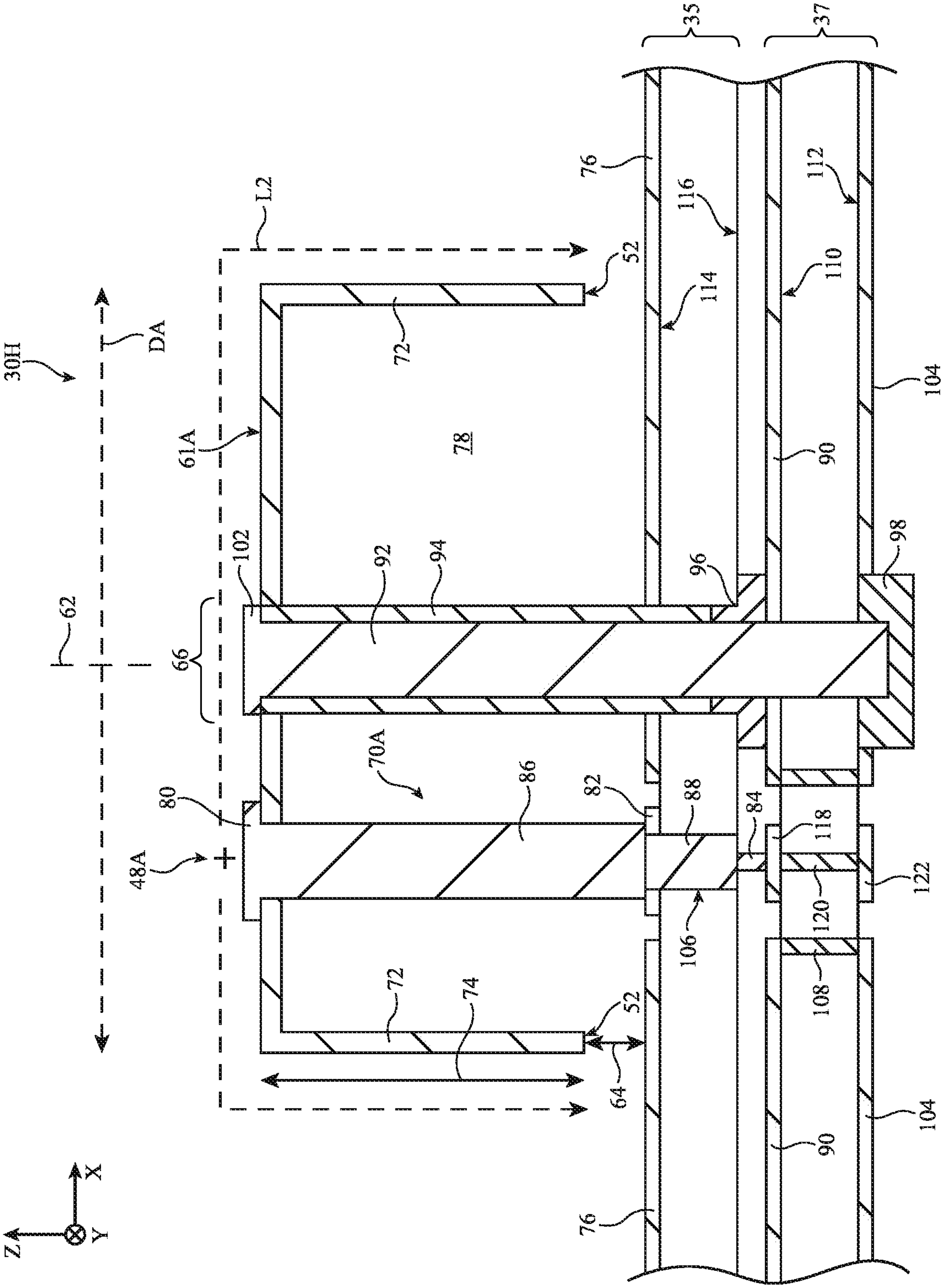
FIG. 6 is a cross-sectional side view of an illustrative free-standing antenna radiator in a high band phased array antenna in accordance with some embodiments.

FIG. 6 is a cross-sectional side view of high band antenna radiator 30H (e.g., as taken along line AA' of FIG. 5). As shown in FIG. 6, substrate 35 may be disposed overlapping substrate 37. Substrates 35 and 37 may each be rigid printed circuit boards, for example. Each printed circuit board may include multiple stacked dielectric layers. Each printed circuit board may include one or more metallization layers interleaved within or layered onto the stacked dielectric layers. The metallization layers may include ground traces, signal traces, control lines, power lines, and/or any other desired metallizations in the printed circuit boards.

Beam forming circuitry 36 (FIG. 2) and/or other components in communication terminal 10 may be mounted to and/or embedded within substrate 37. Substrate 35 may have a first lateral surface 114 and an opposing second lateral surface 116. Lateral surface 116 faces substrate 37. Ground traces 76 may be patterned onto lateral surface 114 of substrate 35. If desired, additional ground traces (not shown for the sake of clarity) may be layered onto lateral surface 116 and/or embedded within substrate 35. If desired, ground traces on different layers or surfaces of substrate 35 may be shorted together using conductive vias (not shown) extending through the dielectric layer(s) of substrate 35, which serve to hold all of the ground traces to the same ground or reference potential (e.g., for forming part of the antenna ground 51 of FIG. 3 for high band antenna radiator 30H).

Substrate 37 may have a first lateral surface 110 facing substrate 35 and an opposing second lateral surface 112. Ground traces 90 may be patterned onto lateral surface 110 of substrate 37. Ground traces 104 may be patterned onto lateral surface 112 of substrate 37. If desired, additional ground traces (not shown for the sake of clarity) may be embedded within substrate 35. If desired, ground traces 90, ground traces 104, and/or ground traces embedded within substrate 37 may be shorted together using conductive vias 108 extending through the dielectric layer(s) of substrate 37. This may serve to hold all of the ground traces to the same ground or reference potential (e.g., for forming part of the antenna ground 51 of FIG. 3 for high band antenna radiator 30H).

As shown in FIG. 6, patch radiator 50H may be mounted to substrate 35 using ground interconnect 66 and feed interconnect 70A. Feed interconnect 70A may include a conductive column 86 extending from self-clinching head 80 to a surface-mount interface that is surface-mounted (e.g., soldered) to a contact pad 82 on lateral surface 114 of substrate 35. Conductive column 86 may extend through a hole or opening in lateral portion 61A of the patch radiator. Self-clinching head 80 may secure feed interconnect 70A to lateral portion 61A of the patch radiator within the hole and may help to establish a robust electrical connection between feed interconnect 70A and the patch radiator at positive antenna feed terminal 48A.

As one example, conductive column 86 may be formed from aluminum to allow for hardness variation between self-clinching head 80 and the sheet metal of high band antenna radiator 30H. If desired, the aluminum in conductive column 86 may be plated with gold to increase shelf life and solderability to the aluminum substrate. If desired, conductive column 86 may be provided with copper underplating to reduce radio-frequency skin-effect ohmic losses. Conductive column 86 is sometimes also referred to herein as standoff 86, conductive standoff 86, or conductive shaft 86.

Contact pad 82 may be electrically floating and is not electrically shorted to ground traces 76. If desired, contact pad 82 may be laterally surrounded by a form-in-place (FIP) ground gasket on ground traces 76. Substrate 35 may have a hole or opening 106 that extends from lateral surface 114 to lateral surface 116. Feed interconnect 70A may include an alignment boss 88 that extends from conductive column 86 through opening 106 to lateral surface 116 of substrate 35. Feed interconnect 70A may include a conductive pogo pin 84 that extends away from alignment boss 88. Alignment boss 88 may serve to capture pogo pin 84 and may help to align the feed interconnect and the substrates. Pogo pin 84 may span the gap between substrates 35 and 37 and presses against contact pad 118 on lateral surface 110 of substrate 37. The compressibility of pogo pin 84 may, for example, help to accommodate tolerance stack up between substrates 35 and 37. If desired, pogo pin 84 may be mechanically and electrically secured to contact pad 118 using surface mount technology (e.g., high volume reflow solder). Contact pad 118 is not electrically shorted to ground traces 90 on substrate 37. Contact pad 118 may be coupled to signal trace 122 on lateral surface 112 of substrate 37 by a conductive via 120 extending through substrate 37. Signal trace 122 is not electrically shorted to ground traces 90.

Signal trace 122 may be coupled a corresponding phase and magnitude controller 38 (FIG. 2) on substrate 37 that performs phase and magnitude adjustments for high band antenna radiator 30H. Signal trace 122, conductive via 120, contact pad 118, pogo pin 84, alignment boss 88, and conductive column 86 collectively form part of the signal conductor of the radio-frequency transmission line (e.g., radio-frequency transmission line 32A of FIG. 3) coupled to positive antenna feed terminal 48A on high band antenna radiator 30H. In this way, feed interconnect 70A may feed radio-frequency signals to high band antenna radiator 30H via positive antenna feed terminal 48A. At the same time, conductive column 86 mechanically mounts and secures high band antenna radiator 30H to lateral surface 114 of substrate 35. The rigidity of conductive column 86 helps to hold the patch radiator as a free-standing sheet metal structure above substrate 35 (e.g., such that its edges 52 remain separated from ground traces 76 by gap 64). Similar structures may be used to implement ground structure 70B for the other antenna feed of high band antenna radiator 30H (FIG. 5).

Similarly, ground interconnect 66 may include a hollow conductive shaft such as conductive shaft 94. Conductive shaft 94 is inserted into an opening in the lateral area 61A of the patch radiator around central axis 62. Conductive shaft 94 may extend from the patch radiator towards substrate 35. If desired, conductive shaft 94 may extend into a hole or opening in substrate 35 that extends from lateral surface 114 to lateral surface 116. While illustrated as a single linear shaft passing into an opening in substrate 35 in FIG. 6 for the sake of simplicity and clarity, conductive shaft 94 may, if desired, have a lower surface (e.g., parallel to the X-Y plane) that is surface mounted to lateral surface 114 of substrate 35, a contact pad on lateral surface 114 (e.g., similar to conductive column 86 of feed interconnect 70A as shown in FIG. 6), and/or ground traces 76 (e.g., using solder). Conductive shaft 94 may, for example, be surface mounted to lateral surface 114 without passing into the opening in substrate 35 or with a portion of conductive shaft 94 passing into the opening. In this way, conductive shaft 94 may form a standoff for high band antenna radiator 30H on substrate 35. Conductive shaft 94 is sometimes also referred to herein as conductive column 94, conductive standoff 94, standoff 94, or grounding standoff 94.

If desired, a conductive board spacer 96 may be inserted into the hole in substrate 35 from lateral surface 116. Conductive board spacer 96 may be electrically shorted (e.g., soldered or welded) to conductive shaft 94 (e.g., within the opening in substrate 35 or at lateral surface 114), may be electrically shorted to conductive shaft 94 by additional conductive material within the hole on substrate 35, or may be electrically isolated from conductive shaft 94. If desired, a hard stop SMT spacer may be mounted between conductive shaft 94 and conductive board spacer 96.

Conductive board spacer 96 may mechanically hold substrate 35 at a fixed distance from substrate 37. There may, for example, be a gap between substrate 35 and substrate 37. The gap may be filled with air, an encapsulating material, other dielectric materials, or may be devoid of air and/or other materials to minimize the weight of communication terminal 10. If desired, conductive board spacer 96 may provide compression control for pogo pin 84 and electromagnetic interference gaskets (not shown) between substrates 35 and 37 and/or may provide thermal conduction between substrates 35 and 37 to maintain a consistent board temperature in communication terminal 10.

Ground interconnect 66 may also include a conductive fastener 92 (e.g., a conductive screw such as a SEMS screw or fastener, a bolt, a pin, etc.). Conductive fastener 92 may be inserted into the conductive shaft 94 and may extend along central axis 62 from the patch radiator through conductive shaft 94, the hole in substrate 35, conductive board spacer 96, and an opening in substrate 37 from lateral surface 110 to lateral surface 112. Conductive fastener 92 may include a head 102 at the patch radiator that helps to hold ground interconnect 66 to the patch radiator and that helps to form a robust electrical connection to the patch radiator. The end of conductive fastener 92 opposite head 102 may be inserted into a locking nut 98 that is mounted to ground traces 104 on lateral surface 112 of substrate 37 (e.g., using solder, an SMT process, etc.). Locking nut 98 serves to lock conductive fastener 92 in place and helps to secure substrate 35 to substrate 37 through ground interconnect 66.

In this way, ground interconnect 66 and the feed interconnects for high band antenna radiator 30H may serve as standoffs for the antenna radiator, holding the patch radiator in place over ground traces 76 and simplifying the assembly process of communication terminal 10. At the same time, ground interconnect 66 helps to assemble and secure substrate 35 to substrate 37 (e.g., the ground interconnects 66 across all of the unit cells 60 (FIG. 4) on substrate 35 may collectively provide a stable and robust mechanical attachment of substrate 35 to substrate 37).

The patch radiator in high band antenna radiator 30H (e.g., patch radiator 50H of FIG. 5) is held above substrate 35 by the feed and ground interconnects. Edges 52 of the patch radiator are bent downwards with respect to lateral portion 61A, forming sidewall 72 of height 74. Lateral portion 61A of the patch radiator is held, by the feed and ground interconnects, above ground traces 76 at a distance equal to the sum of the height of gap 64 and the height 74 of sidewall 72. The dimension L2 of high band antenna radiator 30H may, for example, be given by twice height 74 plus the diameter DA of lateral portion 61A of the patch radiator. There may be a cavity 78 between lateral portion 61A, sidewall 72, and ground traces 76. Cavity 78 may be free of solid dielectric material and/or air. This may serve to minimize the weight of high band antenna radiator 30H and thus communication terminal 10, may maximize the bandwidth of high band antenna radiator 30H, and may minimize dielectric loss for high band antenna radiator 30H.

Figure 7:
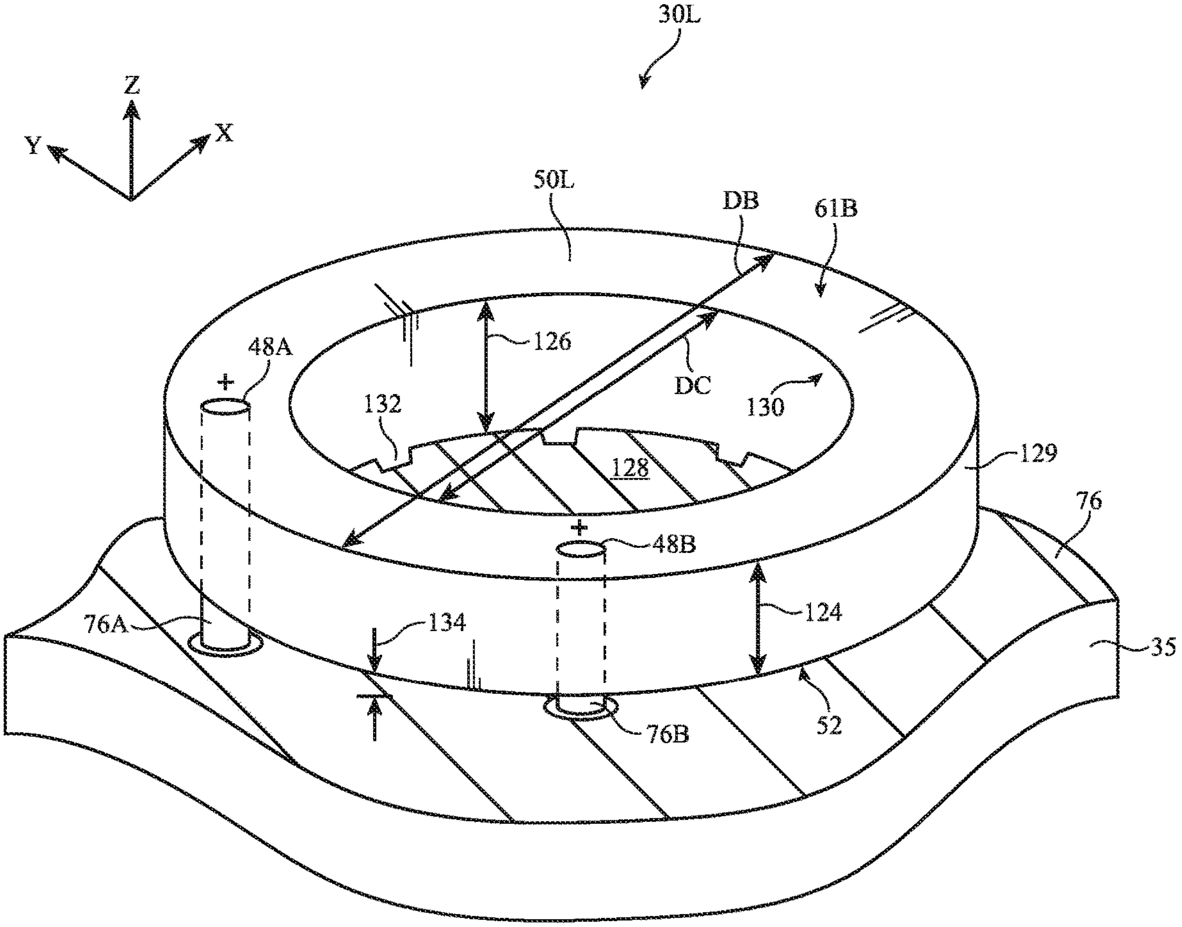
FIG. 7 is a perspective view of an illustrative free-standing antenna radiator in a low band phased array antenna in accordance with some embodiments.

FIG. 7 is a perspective view of a low band antenna radiator 30L in low band phased array antenna 34L in an example where the patch radiator 50L of the low band antenna radiator is implemented as a free-standing folded patch radiator (e.g., from a given unit cell 60 in FIG. 4). The high band antenna radiator 50H and the conductive fence 55 (FIG. 4) of the unit cell has been omitted from FIG. 7 for the sake of clarity.

As shown in FIG. 7, patch radiator 50L have a lateral (planar) portion 61B that lies within or parallel to the X-Y plane. Lateral portion 61B may have an annular shape or ring shape that laterally surrounds a central opening 128. Lateral portion 61B may have an inner edge at central opening 128 and an outer edge opposite the inner edge. Lateral portion 61B may have an inner diameter DC (e.g., as measured across central opening 128) and an outer diameter DB that is greater than inner diameter DC. This is illustrative and, in general, lateral portion 61B may have other shapes or outlines.

To implement patch radiator 50L as a folded patch, the edges 52 of patch radiator 50L may be folded downwards from the outer edge of lateral portion 61B towards substrate 35. This may form a vertical outer sidewall 129 that extends from the outer edge of lateral portion 61B to edges 52. Edges 52 may be vertically separated from ground traces 76 on substrate 35 by gap 134. Outer sidewall 129 may have height 124 (e.g., parallel to the Z-axis).

Additionally or alternatively, patch radiator 50L may have a vertical inner sidewall 130 that is folded downward from the inner edge of lateral portion 61B. Inner sidewall 130 may extend all the way to ground traces 76 and may be mounted to substrate 35 (e.g., using SMT castellations, solder, etc.). Inner sidewall 130 may have a height 126 that is greater than height 124. If desired, inner sidewall 130 may include one or more through hole alignment pins (tabs) 132 that are inserted into openings in ground traces 76 and/or substrate 35 to help align low band antenna radiator 30L on substrate 35.

Inner sidewall 130 may laterally surround central opening 128, may serve to mechanically mount and secure patch radiator 50L to substrate 35, and may electrically short patch radiator 50L to ground traces 76 (e.g., patch radiator 50L may be a CGFP). When the unit cell 60 containing low band antenna radiator 30L is full assembled (FIG. 4), a corresponding high band antenna radiator 30H (FIGS. 3-6) is mounted to substrate 35 within central opening 128 and conductive fence 55 is mounted to substrate 35 around low band antenna radiator 30L. In the example of FIG. 7, patch radiator 50L has a single inner sidewall 130 (e.g., a continuously curved inner sidewall) and a single outer sidewall 129 (e.g., a continuously curved outer sidewall). More generally, patch radiator 50L may have one or more inner sidewalls that follow the inner edge of lateral portion 61B and one or more outer sidewalls that follow the outer edge of lateral portion 61B.

Patch radiator 50L is free-standing and is mounted to substrate 35 without any intervening dielectric layers or supports. For example, patch radiator 50L may be formed from folded, bent, and/or stamped sheet metal that is mounted to ground traces 76 on substrate 35. The sheet metal may be formed from copper, aluminum, or other materials. Forming patch radiator 50L from aluminum may help to minimize the weight of high band antenna radiator 30L. The sheet metal may be provided with a relatively narrow thickness (e.g., 0.5 mm or less) to further reduce weight. At the same time, the sheet metal is thick enough to retain its rigid shape after mounting to substrate 35. Forming patch radiator 50L in this way may leverage both high volume sheet metal manufacturing processes (e.g., progressive die stamping) as well as high volume printed circuit board assembly (PCBA) processes such as surface mount technology (SMT). This may help to facilitate high volume assembly of the phased array antennas in the communication terminal.

Low band antenna radiator 30L may be fed by corresponding positive antenna feed terminals 48A and 48B on lateral portion 61B. A first feed interconnect 76A may couple a first radio-frequency transmission line for low band antenna radiator 30L (e.g., radio-frequency transmission line 32A of FIG. 3) to the positive antenna feed terminal 48A on lateral portion 61B. A second feed interconnect 76B may couple a second radio-frequency transmission line for low band antenna radiator 30L (e.g., radio-frequency transmission line 32B of FIG. 3) to the positive antenna feed terminal 48B on lateral portion 61B. Feed interconnects 76A and 76B may be coupled to the corresponding radio-frequency transmission lines through substrate 35 (e.g., without shorting the feed structures to ground traces 76).

If desired, feed interconnects 76A and 76B may be rigid and may also serve to mechanically mount and secure patch radiator 50L to substrate 35 (e.g., as standoffs for patch radiator 50L). For example, feed interconnects 76A and 76B may include conductive standoffs, conductive pins (e.g., pogo pins), conductive clip, solder, welds, conductive adhesive, conductive brackets, conductive springs, conductive prongs, conductive pillars, conductive columns, and/or any other desired structures that serve to mechanically mount, attach, and/or secure patch radiator 50L to substrate 35 (e.g., while holding patch radiator 50L over substrate 35 such that edges 52 are separated from ground traces 76 by gap 134), while also electrically coupling the positive antenna feed terminals to corresponding radio-frequency transmission lines. Feed interconnects 76 may, for example, each include similar structures to feed interconnects 70A and 70B of high band antenna radiator 30H (FIGS. 5 and 6). Feed interconnects 76 may be mounted to substrate 35 using solder and a surface mount technology (SMT) process, for example. Feed interconnects 76 and inner sidewall 130 may allow patch radiator 50L, which is rigid, to remain free-standing over substrate 35 without any intervening substrates, printed circuit boards, supports, or other dielectric materials between substrate 35 and lateral area 61B of patch radiator 50L.

If desired, one or more notches (not shown in FIG. 7 for the sake of clarity) may be cut into lateral portion 61B, inner sidewall 130, and/or outer sidewall 129 of patch radiator 50L (e.g., similar to notches 68 of FIG. 5). The notches may be used to tune or tweak the frequency response of low band antenna radiator 30L, to perform impedance matching for one or both of the positive antenna feed terminals on low band antenna radiator 30L, to tune the polarization response of low band antenna radiator 30L, and/or to further reduce the weight of low band antenna radiator 30L and thus the communication terminal itself.

Figure 8:
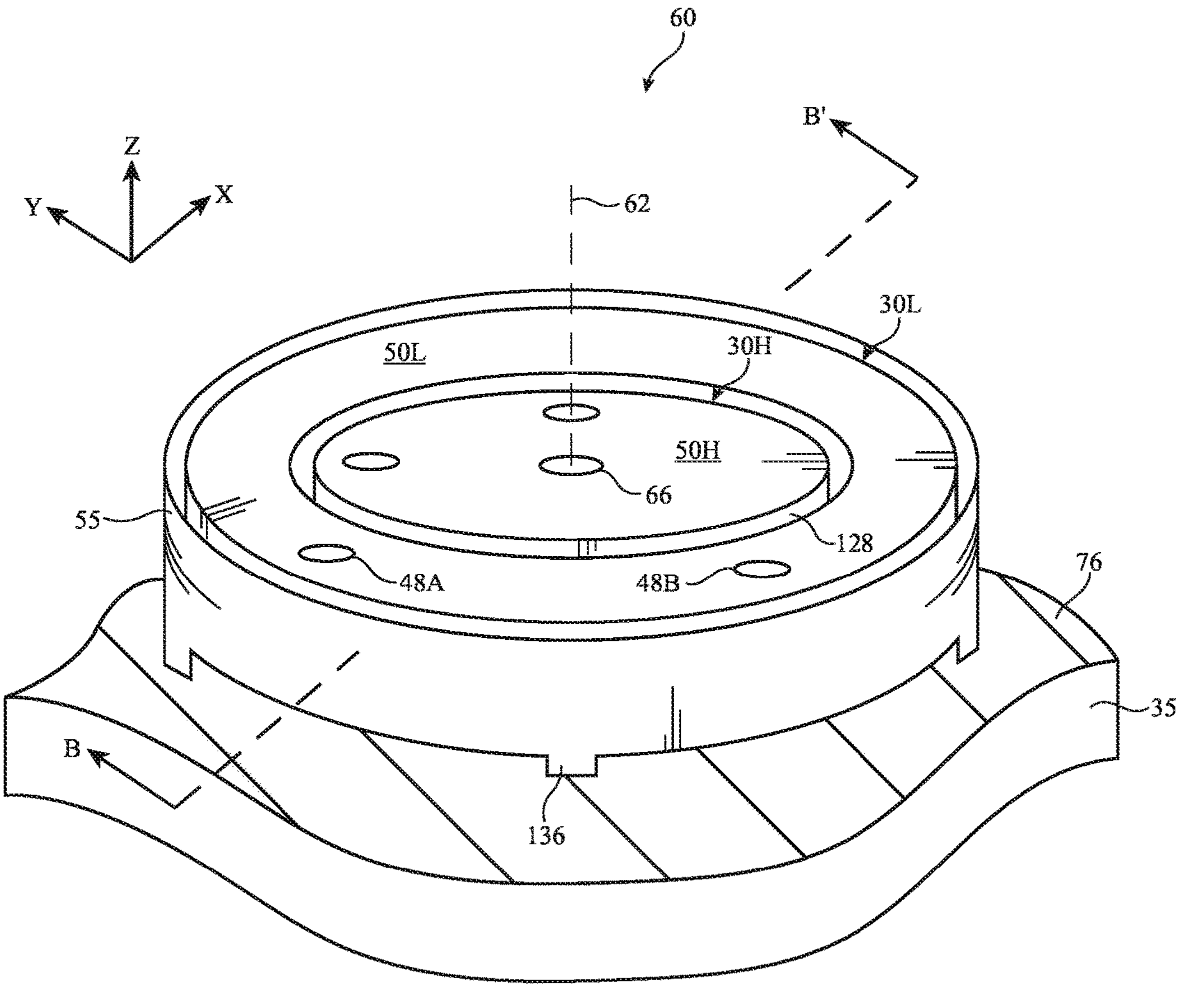
FIG. 8 is a perspective view of an illustrative unit cell having a free-standing antenna radiator of high band phased array antenna nested within a free-standing antenna radiator of a low band phased array antenna in accordance with some embodiments.

FIG. 8 is a perspective view of a fully assembled unit cell 60 on substrate 35. As shown in FIG. 8, unit cell 60 may include a high band antenna radiator 30H surface mounted to substrate 35 (e.g., as shown in FIGS. 5 and 6). Central axis 62 may extend through the center of high band antenna radiator (e.g., through ground interconnect 66). Unit cell 60 may also include a low band antenna radiator 30L surface mounted to substrate 35 (e.g., as shown in FIG. 7). High band antenna radiator 30H is disposed within the central opening 128 of low band antenna radiator 30L. Central axis 62 may also extend through the lateral center of low band antenna radiator 30L.

Unit cell 60 may include a conductive fence 55 that is surface mounted to substrate 35 (e.g., without standoff integration). Conductive fence 55 may be formed from a rigid and free-standing material such as folded, bent, and/or stamped sheet metal. The sheet metal may be relatively thin to minimize weight (e.g., 0.2 mm or thinner). If desired, conductive fence 55 may include one or more through hole alignment pins (tabs) 136 that are inserted into openings in ground traces 76 and/or substrate 35 to help align conductive fence 55 on substrate 35. In this way, high band antenna radiator 30H may be concentric (nested) with low band antenna radiator 30L and conductive fence 55 around central axis 62. Low band antenna radiator 30L laterally surrounds high band antenna radiator 30H in unit cell 60. Conductive fence 55 laterally surrounds low band antenna radiator 30L and high band antenna radiator 30H.

Since conductive fence 55 is electrically shorted to ground traces 76, conductive fence 55 may electromagnetically block radio-frequency signals from other antennas on communication terminal 10 from interfering with the operation of unit cell 60 and/or vice versa. Conductive fence 55 may also serve to optimize the boresight radiation pattern of unit cell 60. At the same time, the inner sidewall 130 of low band antenna radiator 30L may help to electromagnetically isolate low band antenna radiator 30L from high band antenna radiator 30H and/or to optimize the radiation pattern for antenna radiators 30L and/or 30H. Vertical currents along the sidewalls of antenna radiators 30L and 30H and along conductive fence 55 may serve to optimize the radiation pattern of unit cell 60 at angles off of boresight, for example.

The example of FIG. 8 is illustrative and non-limiting. In general, high band antenna radiator 30H, low band antenna radiator 30L, and conductive fence 55 may have any desired shapes or outlines. High band antenna radiator 30H, low band antenna radiator 30L, and conductive fence 55 need not all have the same shape and/or outline. If desired, conductive fence 55 may have a linear shape, a curvilinear shape, or any other desired shape having any desired number of straight and/or curved segments.

Figure 9:
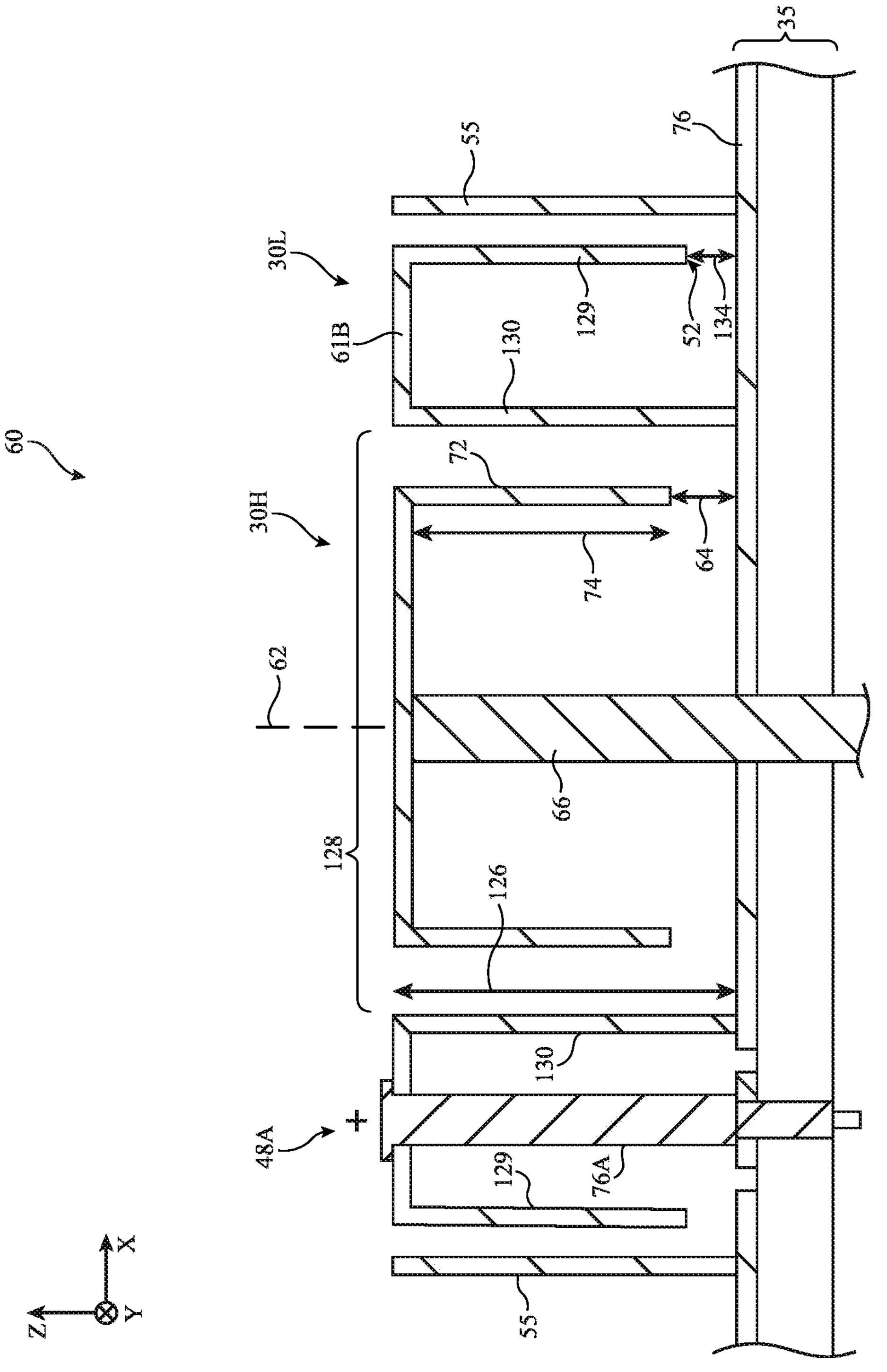
FIG. 9 is a cross-sectional side view of an illustrative unit cell having a free-standing antenna radiator of high band phased array antenna nested within a free-standing antenna radiator of a low band phased array antenna in accordance with some embodiments.

FIG. 9 is a cross-sectional side view of unit cell 60 (e.g., as taken along line BB' of FIG. 8). Substrate 37 (FIGS. 2 and 6) has been omitted from FIG. 9 for the sake of clarity. As shown in FIG. 9, high band antenna radiator 30H is mounted to substrate 35 within central opening 128 of low band antenna radiator 30L. Lateral portion 61B of low band antenna radiator 30L laterally surrounds the lateral portion of high band antenna radiator 30H (e.g., in the same plane).

Inner sidewall 130 of low band antenna radiator 30L may extend from lateral portion 61B to ground traces 76. Inner sidewall 130 has height 126 and may attach low band antenna radiator 30L to substrate 35 while also electrically shorting low band antenna radiator 30L to ground traces 76. The positive antenna feed terminal 48A on low band antenna radiator 30L may be coupled to feed interconnect 76A. Feed interconnect 76A may include similar structures to feed interconnect structure 70A (FIG. 6) and may extend through substrate 35 to electrically couple a signal trace in the radio-frequency transmission line for positive antenna feed terminal 48A to the patch radiator for low band antenna radiator 30L. Feed interconnect 76 may also serve as a standoff for low band antenna radiator 30L that helps to hold low band antenna radiator 30L in place on substrate 35.

The outer sidewall 129 of low band antenna radiator 30L may be separated from ground traces 76 by gap 134. The height of gap 134 may be equal to the height of gap 64 or may be different from the height of gap 64. The height 74 of sidewall 72 on high band antenna radiator 30H plus the height of gap 64 may be equal to height 130 of inner sidewall 130 and/or the height 124 (FIG. 7) of outer sidewall 129 plus the height of gap 134. Conductive fence 55 may form a vertical metal sidewall that laterally surrounds and encloses the other components of unit cell 60. Conductive fence 55 may extend from ground trace 76 to the plane of lateral portion 61B of low band antenna radiator 30L, may extend beyond the plane of lateral portion 61B, or may extend along some but not all of height 126. The space between antenna radiators 30L and 30H and ground traces 76 may be free of solid dielectric material and/or air to maximize the bandwidth of unit cell 60, to minimize radio-frequency dielectric loss, and/or to minimize the weight of the communication terminal.

When implemented in this way, phased array antennas 34L and 34H (FIG. 4) may be manufactured in high volume with minimal weight and while occupying minimal volume on communication terminal 10 (e.g., utilizing the same antenna aperture) and while exhibiting satisfactory levels of radio-frequency performance in both the low and high frequency bands. At the same time, both phased array antennas 34L and 34H may exhibit relatively high antenna gain even at wide beam scanning angles. Implementing the antenna radiators 30 in phased array antennas 34L and 34H as folded patches (or center-grounded folded patches) and the inclusion of conductive fences 55 serve to introduce vertically-flowing radio-frequency antenna currents on the antenna radiators and perpendicular to the plane of substrates 35 and 37. This may serve to optimize the radiation pattern of the antenna radiators at relatively large angles off boresight while also allowing for minimization of the lateral area spanned by each antenna radiator.

The standoffs of antenna radiators 30H and 30L may be fabricated using interference fit standoff integration, laser welded standoff integration, solder-based standoff integration during PCBA SMT process, or other techniques. For interference fit standoff integration, additional flexibility is afforded since a larger diversity of material and coating selections can be selected. For example, solderability may only be required for the standoff, so any additional incurred coating costs, or reduced material selection options can be restricted to the standoffs alone, whereas the folded patch material and coating selection can be optimized separately for other parameters such as cost, flatness, thermal conductivity, electrical conductivity, and surface optical properties (e.g., solar absorptance, emissivity, bidirectional reflection distribution function, etc.). For laser welded standoff integration, additional material compatibility constraints may exist between the folded patches and standoffs to preserve weld quality, and final coatings for solderability (if needed) are applied to the entire welded assembly. For solder-based standoff integration, additional material and coating compatibility constraints may exist between the folded patches and standoffs to preserve solderability.

The example in which patch radiators 50H and 50L and conductive fence 55 are formed from sheet metal is illustrative and non-limiting. If desired, patch radiators 50H, patch radiators 50L, and/or conductive fence 55 may be formed from any other desired conductive materials manufactured using any desired processes (e.g., additive manufacturing, forming, machining, casting, molding, and/or other manufacturing methods). Patch radiators 50H, patch radiators 50L, and/or conductive fence 55 may be formed from metal (e.g., pure metal) and/or other electrically conductive materials (e.g., graphite filled engineered materials, electrically conductive polymers, etc.). If desired, substrates 35 and 37 (FIG. 6) may be replaced with a single substrate (e.g., a single printed circuit board). In these examples, antenna radiators 30H/30L and the corresponding beamforming circuitry may be mounted to the same substrate (e.g., the same printed circuit board).

Communication terminal 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users. If desired, a method of operating the communication terminal as substantially described herein may be provided (e.g., to perform wireless communications with one or more other network nodes).

The foregoing is merely illustrative and various modifications can be made by those skilled in the art without departing from the scope and spirit of the described embodiments. The foregoing embodiments may be implemented individually or in any combination.

What is claimed is:

1. A communication terminal comprising:
- a printed circuit board having a ground trace;
- a first antenna radiator that includes a first folded sheet metal patch overlapping the ground trace;
- a conductive standoff that is coupled to the folded sheet metal patch at a feed terminal and that mounts the folded sheet metal patch to the printed circuit board; and
- a second antenna radiator that includes a second folded sheet metal patch overlapping the ground trace, wherein the second antenna radiator laterally surrounds the first antenna radiator and is concentric with the first antenna radiator about a central axis of the first antenna radiator.

2. The communication terminal of claim 1, wherein the communication terminal is free of solid dielectric material between the folded sheet metal patch and the ground trace.

3. The communication terminal of claim 1, wherein the conductive standoff is soldered to a contact pad on the printed circuit board, the contact pad being electrically isolated from the ground trace.

4. The communication terminal of claim 1, further comprising:
- a conductive alignment boss that extends from an end of the conductive standoff and into an opening in the printed circuit board.

5. The communication terminal of claim 4, further comprising:
- an additional printed circuit board;
- a contact pad on a first surface of the additional printed circuit board;
- a signal trace on a second surface of the additional printed circuit board;
- a conductive via that couples the contact pad to the signal trace through the additional printed circuit board; and
- a pogo pin that couples the conductive alignment boss to the contact pad.

6. The communication terminal of claim 5, further comprising:
- beamforming circuitry on the additional printed circuit board and coupled to the signal trace.

7. The communication terminal of claim 6, wherein the printed circuit board is separated from the additional printed circuit board by a gap and the pogo pin spans the gap.

8. The communication terminal of claim 1, wherein the first antenna radiator is configured to convey radio-frequency signals in a first frequency band,
- the second antenna radiator is configured to convey radio-frequency signals in a second frequency band that is lower than the first frequency band, and at least some conductive material of the first antenna radiator is laterally interposed between the central axis of the first antenna radiator and the second antenna radiator.

9. The communication terminal of claim 8, further comprising:
- a conductive fence surface mounted to the printed circuit board and laterally surrounding the second antenna radiator.

10. The communication terminal of claim 1, further comprising:
- an additional conductive standoff that is coupled to the folded sheet metal patch at the central axis, wherein the additional conductive standoff mounts the folded sheet metal patch to the printed circuit board and the additional conductive standoff is electrically shorted to the ground trace.

11. The communication terminal of claim 10, further comprising:
- an additional printed circuit board;
- beamforming circuitry for the antenna radiator on the additional printed circuit board; and
- a conductive fastener that extends through the additional conductive standoff, a first opening the printed circuit board, and an additional opening in the additional printed circuit board.

12. The communication terminal of claim 11, further comprising:
- a spacer that separates the printed circuit board from the additional printed circuit board; and
- a locking nut surface mounted to the additional printed circuit board, wherein the conductive fastener extends through the spacer and into the locking nut.

13. The communication terminal of claim 1, wherein the folded sheet metal patch has a lateral portion parallel to the ground trace, the lateral portion has an inner edge at a central opening of the folded sheet metal patch, the lateral portion has an outer edge opposite the inner edge, the folded sheet metal patch has an inner sidewall that extends from the inner edge to the ground trace, and the folded sheet metal patch has an outer sidewall that extends from the outer edge towards the ground trace.

14. Wireless circuitry comprising:
- a printed circuit board having a ground trace;
- a first radiating patch mounted to the printed circuit board, wherein the first radiating patch has a first lateral portion parallel to the ground trace, the first radiating patch has a central opening, an inner edge at the central opening, and an outer edge opposite the inner edge, the first radiating patch has an inner sidewall that extends from the inner edge and that is coupled to the ground trace, the first radiating patch has an outer sidewall that extends from the outer edge towards the ground trace, the outer sidewall is separated from the ground trace by a gap, and the first radiating patch is configured to convey radio-frequency signals in a first frequency band; and a conductive fence surface mounted to the ground trace and laterally surrounding the first radiating patch.

15. The wireless circuitry of claim 14, further comprising:

a second radiating patch mounted to the printed circuit board within the central opening of the first radiating patch, the second radiating patch being configured to convey radio-frequency signals in a second frequency band higher than the first frequency band.

16. The wireless circuitry of claim 15, wherein the second radiating patch has a second lateral portion parallel to the ground trace and has a sidewall that extends from the second lateral portion towards the ground trace, the sidewall of the second radiating patch being separated from the ground trace by an additional gap.

17. The wireless circuitry of claim 16, further comprising:

a conductive standoff that mounts the second radiating patch to the printed circuit board along a central axis of the second radiating patch, wherein the sidewall of the second radiating patch is laterally interposed between the conductive standoff and the inner sidewall of the first radiating patch.

18. The wireless circuitry of claim 15, wherein the second radiating patch is concentric with the first radiating patch and the conductive fence about a central axis of the second radiating patch.

19. Apparatus comprising:

a printed circuit board;

first, second, and third antenna radiators surface mounted to the printed circuit board and configured to form a first signal beam in a first frequency band; and fourth, fifth, and sixth antenna radiators surface mounted to the printed circuit board and configured to form a second signal beam in a second frequency band higher than the first frequency band, wherein the first antenna radiator is concentric with the fourth antenna radiator, the first, second, and third antenna radiators are disposed at respective vertices of a first equilateral triangle having sides of a first length, the fourth, fifth, and sixth antenna radiators are disposed at respective vertices of a second equilateral triangle having sides of a second length less than the first length, and the first equilateral triangle at least partially overlaps the second equilateral triangle.

20. The apparatus of claim 19, wherein the printed circuit board has a ground trace, the first, second, and third antenna radiators comprise folded patches overlapping the ground trace, the fourth, fifth, and sixth antenna radiators comprise center-grounded folded patches overlapping the ground trace, the first, second, and third antenna radiators are disposed in respective first, second, and third rows, the fourth and fifth antenna radiators are disposed in the first row, and the sixth antenna radiator is disposed in the second row.

* * * * *